United States Patent
Coyle, Jr. et al.

(10) Patent No.: US 11,739,541 B2
(45) Date of Patent: Aug. 29, 2023

(54) CABLE MANAGEMENT SYSTEM

(71) Applicant: MCS Industries, Inc., Easton, PA (US)

(72) Inventors: Robert Terry Coyle, Jr., Palmer, PA (US); Matthew Scott Kressin, Allentown, PA (US); Martin Zamorano Fragoso, Ciudad Juárez (MX); Geoffrey William Bastian, Easton, PA (US)

(73) Assignee: MCS Industries, Inc.

( * ) Notice: Subject to any disclaimer, the term of this patent is extended or adjusted under 35 U.S.C. 154(b) by 200 days.

(21) Appl. No.: 17/103,355

(22) Filed: Nov. 24, 2020

(65) Prior Publication Data

US 2021/0156154 A1 May 27, 2021

Related U.S. Application Data

(60) Provisional application No. 62/940,731, filed on Nov. 26, 2019.

(51) Int. Cl.
*E04F 19/04* (2006.01)
*H02G 3/04* (2006.01)

(52) U.S. Cl.
CPC ....... *E04F 19/0463* (2013.01); *H02G 3/0418* (2013.01); *E04F 2019/044* (2013.01)

(58) Field of Classification Search
CPC ... E04F 19/04; E04F 19/0463; E04F 19/0468; E04F 2019/044; H02G 3/04; H02G 3/0418; H02G 3/0425
See application file for complete search history.

(56) References Cited

U.S. PATENT DOCUMENTS 2,312,580 A * 3/1943 O'Brien ............... H01R 25/164
439/216
3,262,083 A * 7/1966 Gooding ................. E04F 19/04
174/101

(Continued)

FOREIGN PATENT DOCUMENTS

DE       2410389       9/1975
DE   200920002767    *  2/2007 ............ E04F 19/045

(Continued)

OTHER PUBLICATIONS https://www.amazon.com/Orac-Decor-Polystyrene-Baseboard-Moulding/dp/B085ML85QQ/ref=pd_day0_201_1/136-0504586-8230141?_encoding=U.

(Continued)

*Primary Examiner* — Kyle J. Walraed-Sullivan
(74) *Attorney, Agent, or Firm* — BELLES KATZ LLC

(57) ABSTRACT

A cable management system includes a mounting bracket configured for mounting to a wall surface and a detached snap-on type cover member. The mounting bracket includes vertically spaced support ledges for supporting one or more cables in multiple regions of the bracket. The bracket and cover member include mating connection element protrusions which become mutually engaged to snap fit the cover to the bracket in a readily removable manner to access the cable runs. The cables are fully concealed by the cover member. In one embodiment, the bracket and cover member are configured to simulate baseboard molding in appearance and are mounted at the bottom of the wall at the interface with the floor. Coupler members complementary configured to match the profile of the cover members may be detachably coupled thereto to bridge joints or gaps between adjacent sections of cover members.

12 Claims, 29 Drawing Sheets

(56) References Cited

U.S. PATENT DOCUMENTS

| | | | | |
|---|---|---|---|---|
| 3,786,171 | A * | 1/1974 | Shira | H02G 3/0425 138/108 |
| 4,216,823 | A * | 8/1980 | Keldmann | H02G 3/0425 248/233 |
| 4,534,147 | A * | 8/1985 | Cristell | H02G 3/0431 174/68.3 |
| 4,583,802 | A * | 4/1986 | Hwang | H02G 3/0425 439/120 |
| 5,024,614 | A * | 6/1991 | Dola | H02G 3/0431 174/491 |
| 5,126,509 | A * | 6/1992 | Yen | E04F 19/0495 174/99 R |
| 5,243,800 | A * | 9/1993 | Olbrich | F16L 3/227 52/287.1 |
| 5,274,972 | A * | 1/1994 | Hansen | F16L 3/26 52/287.1 |
| 5,459,810 | A * | 10/1995 | Villa | H01R 25/162 392/352 |
| D371,343 | S * | 7/1996 | Loftus | D13/155 |
| 5,887,831 | A * | 3/1999 | Post | H02G 3/26 248/237 |
| 6,021,619 | A * | 2/2000 | Månsson | H02G 3/0425 52/220.8 |
| 6,202,380 | B1 * | 3/2001 | Trutwin | H02G 3/0425 52/287.1 |
| 6,216,406 | B1 * | 4/2001 | Hauser | H02G 3/0425 52/287.1 |
| 6,287,046 | B1 * | 9/2001 | Neuhofer, Jr. | E04F 19/0463 16/16 |
| 6,557,311 | B1 * | 5/2003 | Mongelli | E04F 19/0436 52/288.1 |
| 6,644,988 | B2 * | 11/2003 | Healy | H02G 3/0425 439/120 |
| 7,128,585 | B2 * | 10/2006 | Evilsizer | H01R 25/14 439/216 |
| 2002/0148627 | A1 * | 10/2002 | Seamans | H02G 3/266 174/504 |
| 2003/0089515 | A1 * | 5/2003 | Federspiel | H02G 3/0437 174/480 |
| 2003/0140583 | A1 * | 7/2003 | Sauter | E04F 19/0468 52/287.1 |
| 2004/0040235 | A1 * | 3/2004 | Kurtz | E04F 19/0468 52/289 |
| 2004/0168384 | A1 * | 9/2004 | Wesolowska | E04F 19/04 52/287.1 |
| 2006/0080925 | A1 * | 4/2006 | Rossetti | E04F 19/04 52/27 |
| 2006/0096203 | A1 * | 5/2006 | Weinstein | E04F 19/0463 52/288.1 |
| 2006/0151209 | A1 * | 7/2006 | Makwinski | H02G 3/0418 174/481 |
| 2007/0074470 | A1 * | 4/2007 | Bendrell | H02G 3/0425 52/220.1 |
| 2007/0251167 | A1 * | 11/2007 | Kaplan | H02G 3/0431 52/287.1 |
| 2008/0202049 | A1 * | 8/2008 | Galas | E04F 19/0495 52/288.1 |
| 2008/0236072 | A1 * | 10/2008 | Johnston | B29C 48/30 52/290 |
| 2010/0018145 | A1 * | 1/2010 | Ellis | H02G 3/0425 52/312 |
| 2010/0071288 | A1 * | 3/2010 | Jun | E04F 19/0468 52/288.1 |
| 2011/0108318 | A1 * | 5/2011 | Pawlak | E04F 19/0468 174/504 |
| 2014/0196393 | A1 * | 7/2014 | Schlueter | E04F 19/04 52/384 |
| 2014/0338276 | A1 * | 11/2014 | Halischuk | E04F 19/0436 52/272 |
| 2017/0203548 | A1 * | 7/2017 | Balcaen | B32B 21/02 |
| 2018/0269666 | A1 * | 9/2018 | Baldwin | H02G 3/0425 |
| 2020/0014181 | A1 * | 1/2020 | Faith | H02G 3/0418 |
| 2020/0088965 | A1 * | 3/2020 | Holmberg | H02G 3/0418 |
| 2020/0161845 | A1 * | 5/2020 | Sedlacek | H02G 3/0418 |
| 2021/0229607 | A1 * | 7/2021 | Fujimura | H02G 3/0418 |

FOREIGN PATENT DOCUMENTS

| | | | |
|---|---|---|---|
| EP | 504496 A1 * | 9/1992 | E04F 17/08 |
| EP | 3217495 A1 | 9/2017 | |
| GB | 1020164 A | 2/1966 | |
| WO | WO 02/19491 | 3/2002 | |

OTHER PUBLICATIONS https://www.homedepot.com/p/Commercial-Electric-5-ft-1-2-Round-Baseboard-Cord-Channel-White-A50-5W/304502799?MERCH=REC-_-PLP_Brow.
https://www.grainger.com/product/D-LINE-Raceway-38G183.
https://www.cableorganizer.com/p/wirerun-snapper-raceways/.
PCT Office, International Search Report and Written Opinion for PCT International Patent Application PCT/US2020/061979 dated Feb. 12, 2021, pp. 1-11.

* cited by examiner

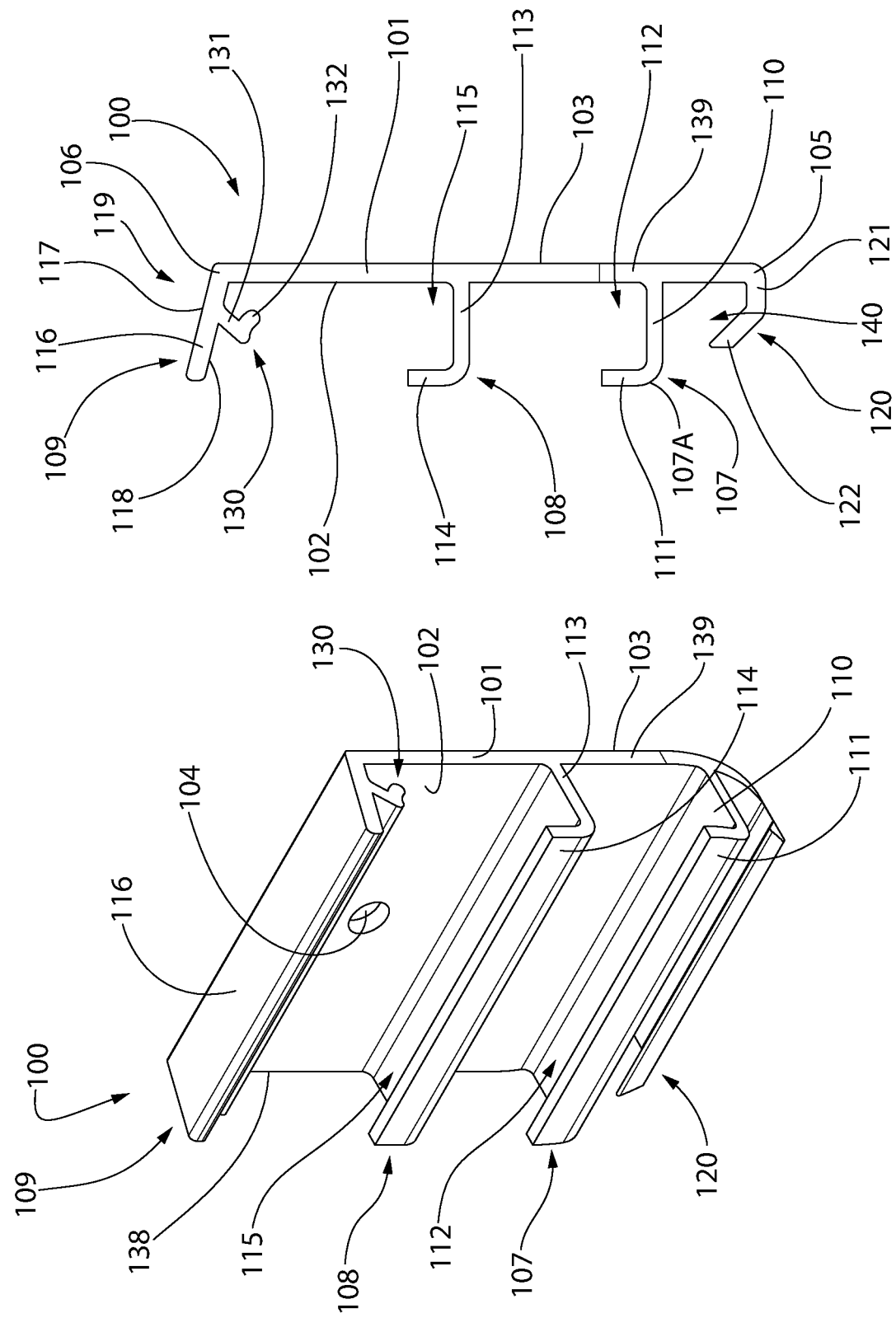

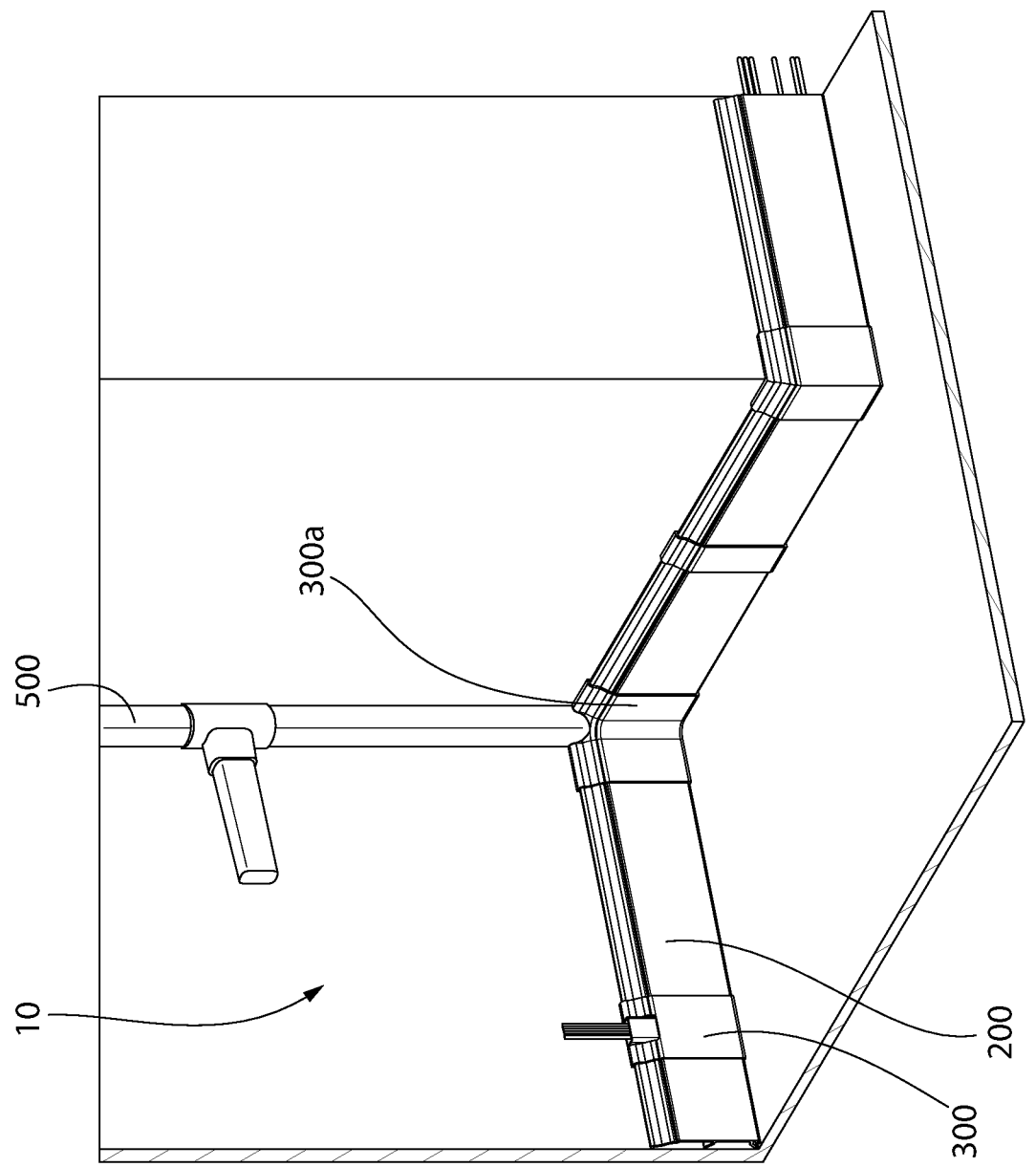

CABLE MANAGEMENT SYSTEM

CROSS-REFERENCE TO RELATED APPLICATIONS

The present application claims priority to U.S. Provisional Application No. 62/940,731 filed Nov. 26, 2019; the entirety of which is incorporated herein by reference.

BACKGROUND

In order to provide power and/or Internet access to various electronic devices in a home or office, wires and cables must extend from a wall outlet, router, or other source of such power or Internet access to different electronic devices. Such wires and cables can be unseemly when they are made to run along the walls and/or floors in a home or office, creating an undesirable aesthetic. In some instances, people may find a way to hide such wires and cables behind the walls in the home or office. However, to do this properly and in an aesthetically pleasing manner, some construction contractor expertise may be required. Thus, a need exists for a cable management system that is easy to install and cost-effective while achieving the end goal of hiding wires and cables that are spanning across a home or office space. In addition, such a system is desired which provides ready access to the cables for replacement or addition of new cables.

SUMMARY

The present disclosure provides a cable management system which meets the above needs. The system is configured to conceals wiring and cabling in a manner which provides an aesthetically pleasing appearance which readily blends into the décor of the home or office space. The cable management system further is configured to allow ready access to the wiring/cabling runs via snap-on type covers. In addition, the system is designed to minimize damage to the walls of the space such that the system components can be removed in a manner which requires minimal building repairs such as simply spackling. The system components are further configured to contain and conceal a plurality of different wires/cables in an organized manner such that telecommunication cables, power cables, Ethernet cables, and other types can be separated into discrete and designated sections inside the components.

In one aspect, a cable management system comprises: a mounting bracket configured to be coupled to a wall support surface so that a rear wall of the mounting bracket is adjacent to the wall support surface, the rear wall including a bottom end configured to engage a floor surface and a top end; the mounting bracket comprising at least one ledge extending forwardly from the rear wall in a direction away from the wall support surface, the at least one ledge configured to support one or more cables; and a cover member detachably coupled to the mounting bracket so that the one or more cables supported by the at least one ledge are hidden from view by the cover member.

In another aspect, a cable management system comprises: a plurality of mounting brackets coupled to a support wall in spaced apart relation, each mounting bracket comprising a vertical rear wall coupled to the support wall and a plurality of ledges, the rear wall including a bottom end configured to engage a floor surface and a top end; the ledges comprising an uppermost ledge at the top end, a lowermost ledge, and a middle ledge spaced vertically apart from and between the uppermost and lowermost ledges, the ledges each protruding from the rear wall in a forward direction away from the support wall and configured to support one or more cables; a plurality of lower cable routing regions formed between the uppermost, middle, and lowermost ledges, and an upper cable routing region formed above the uppermost ledge; the lower and upper cable routing regions each configured to receive the one or more cables; and a separable cover member detachably coupled to the mounting bracket via an interference snap-fit arrangement; wherein the one or more cables are concealed by the cover member from view.

In another aspect, a method for installing a cable management system comprises: providing a mounting bracket and a separate cover member configured for attachment to the mounting bracket; coupling the mounting bracket to a vertical support wall, the mounting bracket comprising a plurality of horizontally protruding cable support ledges configured to support one or more cables; positioning the cover member at an oblique angle adjacent to the mounting bracket; inserting a rearwardly protruding first connection element of the cover member into a forwardly open receptacle formed at a bottom end of the mounting bracket; pivoting the cover member about the first connection element such that a top end of the cover member rotates rearwardly towards a top end of the mounting bracket; and snapping the cover member to the mounting bracket; wherein the one or more cables are hidden from view by the cover member.

BRIEF DESCRIPTION OF THE DRAWINGS

The present invention will become more fully understood from the detailed description and the accompanying drawings, wherein:

FIGS. 3A and 3B are perspective and side views respectively of a mounting bracket of the cable management system of FIG. 1;

FIG. 10 is an illustration of the cable management system of FIG. 1 installed in a room along with some additional components;

Figure 1:
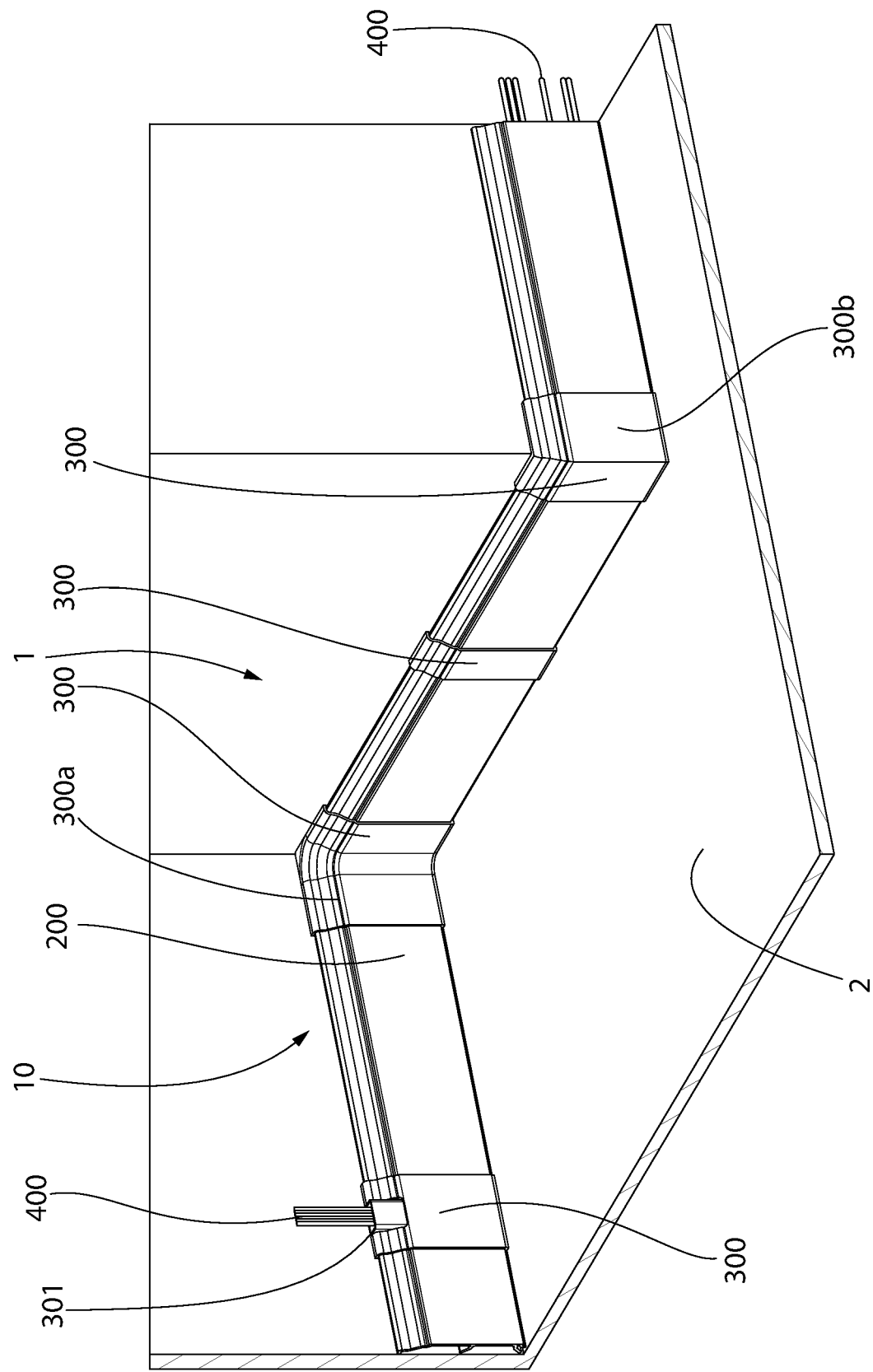
FIG. 1 is a perspective view of a cable management system in accordance with a first embodiment of the present invention.

All drawings are schematic and not necessarily to scale. Features appearing numbered in some figures but not others are the same features unless noted otherwise.

DETAILED DESCRIPTION

The features and benefits of the invention are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features. The following description is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, any ranges disclosed herein are used as shorthand for describing each and every value that is within the range. Any value within the range can be selected as the terminus of the range.

The terms "wiring," "cabling," and "cords" may be used interchangeably herein in a non-distinguishing manner such that reference to one encompasses the any of the others. For simplicity and convenience of description, these components may be collectively referred to herein in a generic sense by use of the terms "cable(s)" or "cabling" which comprise metal conductors used for any purpose such as without limitation transmission of electrical power, digital data, communication signals, audio signals, visual signals, or other.

Figure 2:
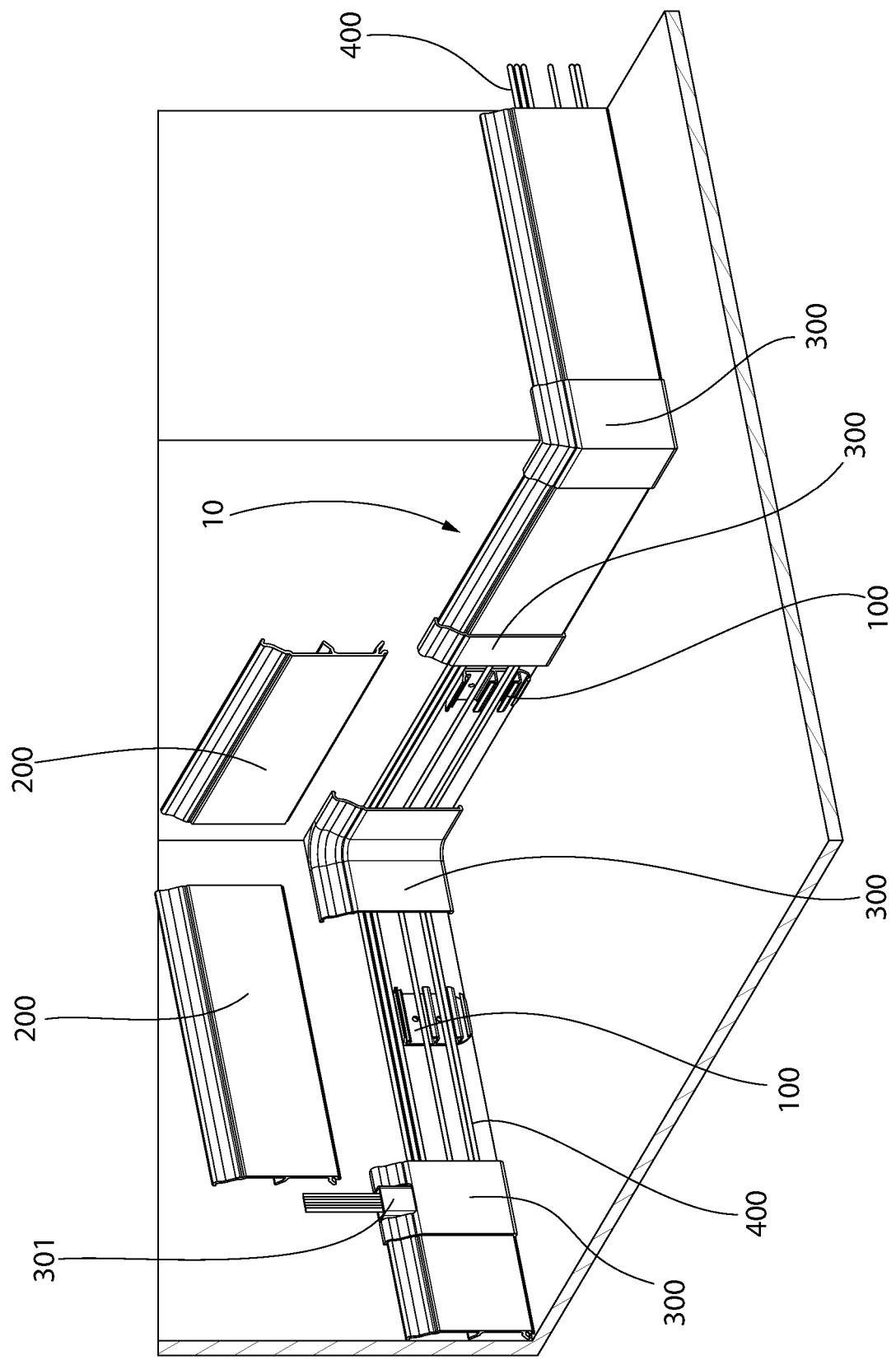
FIG. 2 is a partially exploded view of the cable management system of FIG. 1.

Referring to FIGS. 1 and 2, a cable management system 10 is illustrated in accordance with an embodiment of the present invention. The cable management system 10 is a system of components that can be coupled to a wall or other support surface in an interior space of a room and that interact with one another to hide various wires and cables from view. Stated another way, the cable management system 10 is a system of components that are configured to be coupled to a support surface, which may be a wall in a room, a door, or a part of a physical structure in the room, such as a wall of a cabinet or the like. The cable management system 10 may take the place of conventional baseboards or chair rails so that cables can be run along the walls to which the cable management system 10 is attached while keeping the cables out of view. Furthermore, as will be described herein, the cable management system 10 is a simple, easy, and cost-effective way to store and route cables or wires in a room while allowing a user to have ready access to the cables or wires once installed.

The cable management system 10 generally comprises a plurality of mounting brackets 100, a plurality of cover members 200, and a plurality of coupler members 300 that interact with one another to hide cables and wires from view. The components of the cable management system 10 may be extruded out of a desired material including plastics, metals, elastomeric materials, vinyl, or the like. Alternatively, the components of the cable management system 10 may be manufactured out of the aforementioned materials in an injection molding process. In still other embodiments, the components of the cable management system 10 may be formed out of wood or other desired materials. The materials may be mixed such that for example the mounting brackets 100 may be formed of a first material (e.g. metal or plastic) and the cover and coupling members 200, 300 may be formed of a different second material (e.g. metal or plastic). Accordingly, numerous combinations of different materials may be used. In other implementations, these components may be all formed of the same material.

The coupler members 300 may include inside corner coupler members 300a and outside corner coupler members 300b for positioning over and around corner regions of a wall (e.g. building wall or furniture wall such as built-in bookcases/cabinets). Furthermore, one or more of the coupler members 300 may comprise a cord port 301 for receiving cords 400 as described herein. Specifically, as seen in FIGS. 1 and 2, a plurality of cords 400 pass through the cord port 301 of one of the coupler members 300. The cords 400 (or portions thereof) that pass through the cord port 301 are then hidden from view by the cover members 200 and the coupler members 300. In some embodiments, it may be possible to omit the coupler members 300 so that only the mounting brackets 100 and the cover members 200 are used to form the cable management system 10. In the exemplified embodiment, the cords 400 are supported on ledges of the mounting brackets 100, as described in more detail below.

Referring to FIGS. 3A and 3B, the mounting brackets 100 will be described in greater detail. Mounting brackets 100 are configured for detachable mounting to a wall 1 of the building structure or furniture. The mounting brackets 100 generally comprise a rear wall 101 having a front surface 102 and a rear surface 103. The direction from the rear surface defines a forward direction, and the opposition direction from the front surface to the rear surface defines a rearward direction of the cable management system 10. In the exemplified embodiment, the rear wall 101 is a flat, planar wall such that the front surface 102 is planar and the rear surface 103 is also planar. The front and rear surfaces 102, 101 may be parallel to each other in one embodiment. Rear wall 101 is vertical in one embodiment in the mounted position on wall 1. The rear wall 101 extends from a bottom end 105 to a top end 106 and also from a first side edge 138 to an opposite second side edge 139. The rear wall 101 has a height measured from the bottom end 105 to the top end 106 and a width measured from the first side edge 138 to the second side edge 139. The rear wall 101 may comprise at least one mounting aperture 104 extending therethrough from the front surface 102 to the rear surface 103. Thus, during installation of the cable management system 10, a user can insert a fastener (nail, screw, or the like) through the mounting aperture 104 and into the wall to couple the mounting bracket 100 to the wall. The rear surface 103 of the rear wall 101 of the mounting bracket 100 is positioned in abutting contact with a wall and the bottom end 105 of the rear wall 101 is adjacent to or potentially in contact with the floor 2 of the room from which the wall perpendicularly projects when the mounting bracket 100 is coupled to the wall.

The mounting bracket 100 comprises a plurality of ledges extending from the front surface 102 of the rear wall 101. Specifically, the plurality of ledges comprises a first ledge 107, a second ledge 108, and a third ledge 109 that are spaced vertically apart along the front surface 102 of the rear wall 101. Each of the first, second, and third ledges 107, 108, 109 may extend across the front surface 102 of the rear wall 101 from the first side edge 138 thereof to the second side edge 139 thereof. Thus, the first, second, and third ledges 107, 108, 109 extend along a full width of the rear wall 101 in the exemplified embodiment. In other embodiments, the first, second, and/or third ledges 107, 108, 109 may be formed by segments that are spaced apart along the width of the rear wall 101. In still other embodiments, the first, second, and/or third ledges 107, 108, 109 may extend along a portion of the width of the rear wall 101 but not the entirety of the width of the rear wall 101.

The first ledge 107 comprises a first portion 110 extending from the front surface 102 of the rear wall 101 and an integral second portion 111 extending upwardly from the first portion 110. In the exemplified embodiment, the first portion 110 is perpendicular to each of the front surface 102 of the rear wall 101 and the second portion 111. The intersection of first and second portions 110, 111 of ledge 107 defines a corner which forms a pivot axis about which the cover member 200 may be rotated for coupling to the mounting bracket 100, as further described herein. The corner defines a rounded convex bearing surface 107A which engages and nests in a mating rounded concave bearing surface 210A of the cover member 200 to facilitate pivotably moving the cover member in a hinge-like manner to snap-fit the cover member to the mounting bracket.

The first ledge 107 of mounting bracket 100 defines a first cable receiving region 112. The second ledge 108 comprises a first portion 113 extending from the front surface 102 of the rear wall 101 and an integral second portion 114 extending upwardly from the first portion 113. In the exemplified embodiment, the first portion 113 is perpendicular to each of the front surface 102 of the rear wall 101 and the second portion 114. The second ledge 108 defines a second cable receiving region 115. In the exemplified embodiment, each of the first and second ledges 107, 108 are generally L-shaped, which may assist in retaining and/or holding cables in the first and second cable receiving regions 112, 115 as described further herein.

The third ledge 109 comprises an arm 116 extending obliquely from the front surface 102 of the rear wall 101 in the exemplified embodiment, although the arm 116 could extend perpendicularly from the front surface 102 of the rear wall 101 in other embodiments. The arm 116 has a top surface 117 and a bottom surface 118, the bottom surface 118 facing the second cable receiving region 115 of the second ledge 108. In the exemplified embodiment, the arm 116 extends from the rear wall 101 at the top end 106 of the rear wall 101 and in an obliquely angle upward direction away from the second ledge 108. Thus, no portion of the rear wall 101 protrudes above the arm 116 in this embodiment, whereas the rear wall 101 protrudes both above and below each of the first portions 110, 113 of the first and second ledges 107, 108 in the exemplified embodiment. The third ledge 109 defines a third cable receiving region 119 formed above the ledge.

Accordingly, mounting bracket 100 in one embodiment is configured by first, second, and third ledges 107, 108, 109 to divide the cable management system into a plurality of discrete cord routing or receiving regions 112, 115, and 119 for organizing the cables 400. This allows the cabling to be physically separated and spaced apart by type/use (e.g. power, audio, telecommunications, local area network (LAN) Ethernet, etc.) for better cord organization and management, and in some cases for isolation by providing provides separation via the physical barriers provided by the ledges to prevent signal interference and cross-talk between the cabling. For example, it is known that electric power cables can interfere with audio or visual cables signals if in contact or relatively close proximity. Accordingly, the discrete cord routing areas advantageously eliminates such potential problems as well as providing superior organization of cabling.

The mounting bracket 100 also comprises a first connection element 120 and a second connection element 130, both of which mate with portions of the cover member 200 to couple the cover member 200 to the mounting bracket 100, as described in more detail below. In the exemplified embodiment, the first connection element 120 comprises a first portion 121 protruding perpendicularly from the front surface 102 of the vertical rear wall 101 at the bottom end 105 of the rear wall 101 and a second portion 122 extending upwardly from the first portion 122. In the exemplified embodiment, the second portion 122 extends obliquely, and more specifically at an oblique angle, relative to the first portion 121 of the first connection element 120. The portions collectively provide an upwardly curved hook-shaped first connection element 120 which defines a forwardly open receptacle 140 bounded at top by ledge 107 (see, e.g. FIG. 3B).

The second connection element 130 protrudes downwardly from bottom surface 118 of the arm 116 of the third ledge 109 in a direction towards the second ledge 108. Specifically, the second connection element 130 comprises a first portion 131 extending downwardly from the bottom surface 118 of the arm 116 of the third ledge 109 in a direction away from the rear wall 101 and a second portion 132 extending from the first portion 131 in a direction that is downward and towards the front surface 102 of the rear wall 101. The first and second portions 131, 132 of the second connection element 130 may form an L-shaped hook or resilient tab feature that can flex slightly as the cover member 200 is being coupled to the mounting bracket 100, as described in more detail herein below. The first and second connection elements 120, 130 extend the full width of the rear wall 101 in the exemplified embodiment, but this may not be required in all embodiments.

Figure 4A:
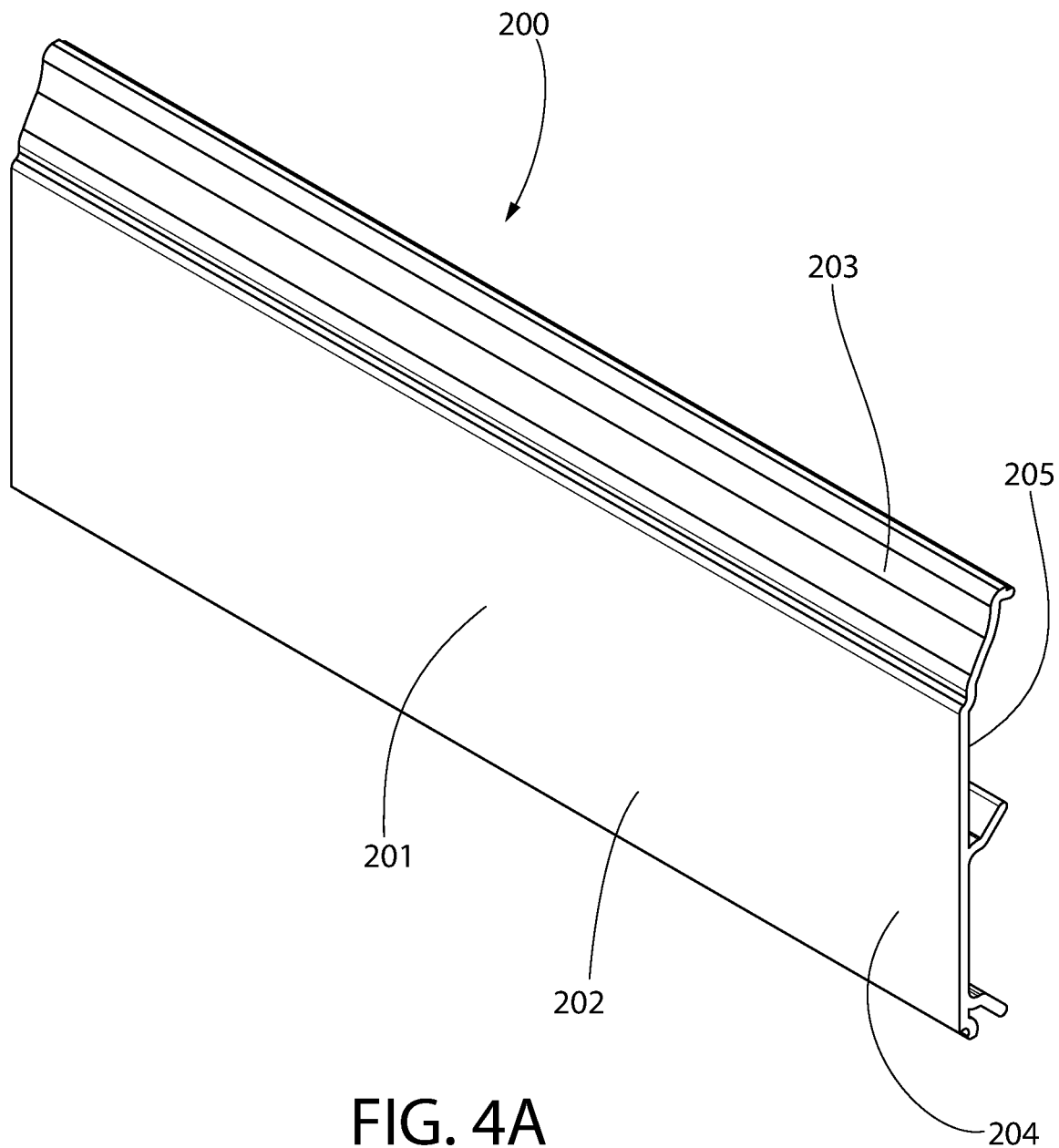
FIGS. 4A and 4B are perspective and side views respectively of a cover member of the cable management system of FIG. 1.
Figure 4B:
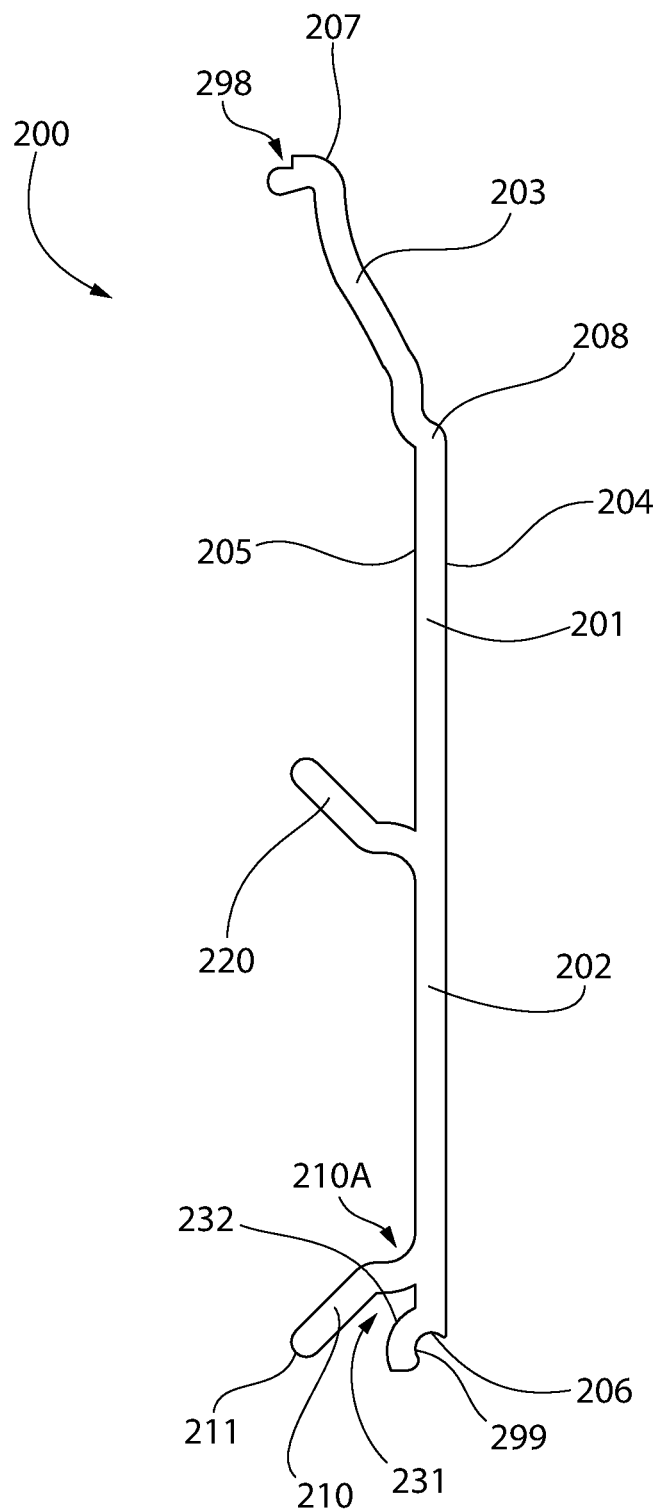

Referring to FIGS. 4A and 4B, the cover member 200 will be described. The cover member 200 comprises a front wall 201 having a main body portion 202 and an upwardly extending molding portion 203. Front wall 201 may be vertical in one embodiment (in the mounted position to mounting bracket 100 as shown in FIG. 8C) and is substantially taller in height than molding portion 203. The molding portion 203 may be angled obliquely rearward to the body portion 202 to slope towards and contact the wall 1 when mounted to the bracket 100. The front wall 201 has a front surface 204 and a rear surface 205. The front and rear surface portions of the main body portion 202 may be planar and parallel to each other. The front surface 204 of the front wall 201 is exposed to a room when the cable management system 10 is installed on a wall. Thus, the front surface 204 of the front wall 201 may have an appearance that is similar to the appearance of a traditional wood baseboard. For example, the front surface 204 body portion 202 of the front wall 201 may be plain and planar whereas the front surface 204 of the molding portion 203 of the front wall 201 may have a desired ornamental appearance such as having various bevels, contours, stepped portions, or the like which mimics a traditional wood baseboard. The invention is not intended to be limited by the particular appearance of the molding portion 203 as shown in the drawings. The front wall 201 extends from a bottom end 206 to a top end 207. Furthermore, the body portion 202 of the front wall 201 extends from the bottom end 206 to a top end 208, such that the top end 208 of the body portion 202 also forms the bottom end of the molding portion 203.

The cover member 200 comprises a first connection element 210 and a second connection element 220, each extending from the rear surface 205 of the body portion 202 of the front wall 201. The first and second connection elements 210, 220 may extend continuously or as spaced apart segments between opposing first and second sides of the front wall 201 in some embodiments, or they may extend less than the entire width of the front wall 201 between the first and second sides thereof.

The first connection element 210 is located adjacent to the bottom end 206 of the front wall 201. The first connection element 210 extends outwardly from the rear surface 205 of the front wall 201 and then downwardly in a direction towards but spaced apart from the bottom end 206 of the front wall 201. Element 210 is obliquely oriented to the vertical front wall 201 of cover member 200 (see, e.g. FIG. 4B) and defines a downwardly and rearwardly open receptacle 231 configured to receive first connection element 120 of mounting bracket 100 at least partially therein (FIG. 8C). The lower portion of receptacle 231 is bounded by an arcuately convexly curved guide element 232 which extends rearwardly from and downwardly below bottom end 206 of front wall 201. Guide element 232 helps direct connection element 120 of the mounting bracket into the receptacle 231 when mounting the cover member 200 to the bracket. In the exemplified embodiment, a terminal end 211 of the first connection element 210 is located below (i.e., extends past) the bottom end 206 of the front wall 201, although this may not be required in all embodiments. In the exemplified embodiment, the second connection element 220 is located at an approximate midpoint between the bottom end 206 of the body portion 202 of the front wall 201 and the top end 208 of the body portion 202 of the front wall 201. The exact location/position of the second connection element 220 may be modified from that which is depicted in the drawings so long as it is configured to mate with the second connection element 130 of the mounting bracket 100 as described in greater detail below. In the exemplified embodiment, the second connection element 220 extends outwardly from the rear surface 205 of the front wall 201 and then upwardly towards the top end 207 of the front wall 201.

When cover member 200 is coupled to the mounting bracket 100, the rear surface 205 of the front wall 201 of the cover member faces the mounting bracket 100 so that an enclosed cavity 230 is defined between the rear surface 205 of the front wall 201 and the wall to which the mounting bracket 100 is attached. This enables the cables 400 that pass through the cord port 301 to be located within the enclosed cavity 230, which keeps them out of view.

Figure 5A:
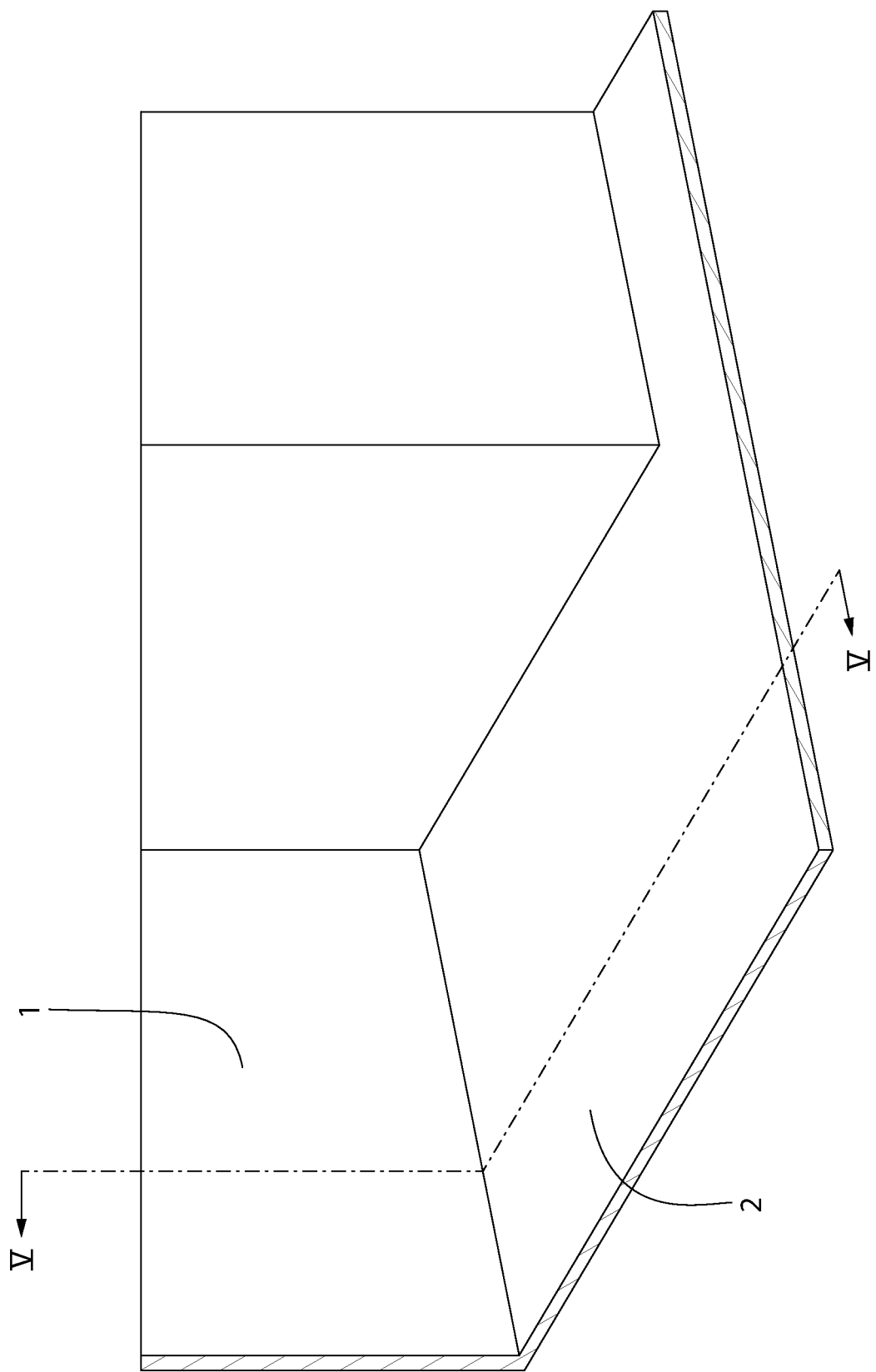
FIG. 5A is a perspective view of a wall and floor in a room such that the cable management system of FIG. 1 can be coupled thereto.
Figure 5B:
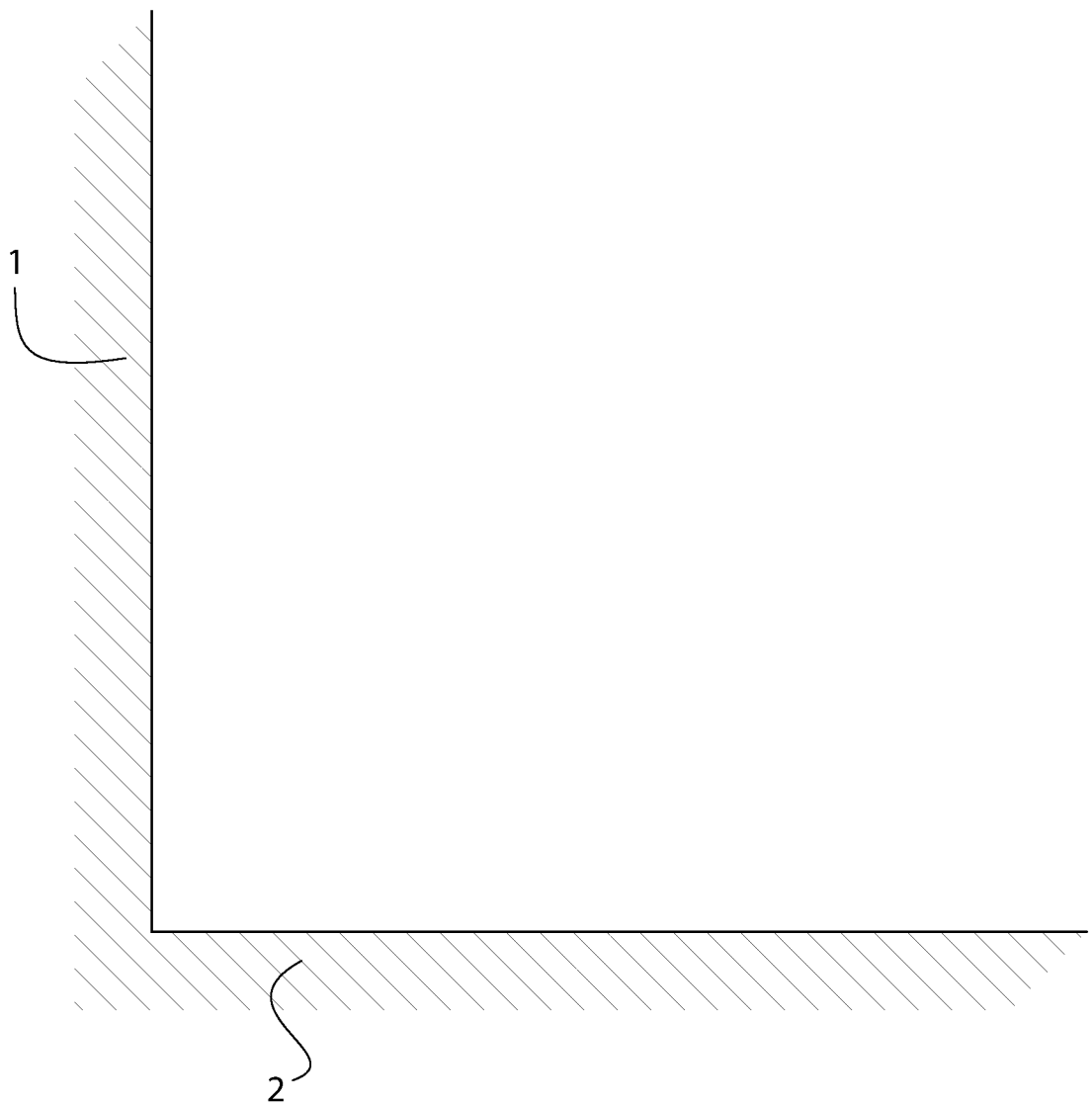
FIG. 5B is a cross-sectional view taken along line V-V of FIG. 5A.

Referring to FIGS. 5A-9B, a method for installing and assembling the cable management system 10 will be described. In FIGS. 5A-9B, the "A" (suffix) figure is a partial cut-away perspective view of a room having a wall 1 and a floor 2 and the "B" (suffix) figure is a cross-sectional view taken along its respective "A" view as shown. FIGS. 5A and 5B illustrate the room with the wall 1 and the floor 2 prior to installation of the cable management system 10.

Figure 6A:
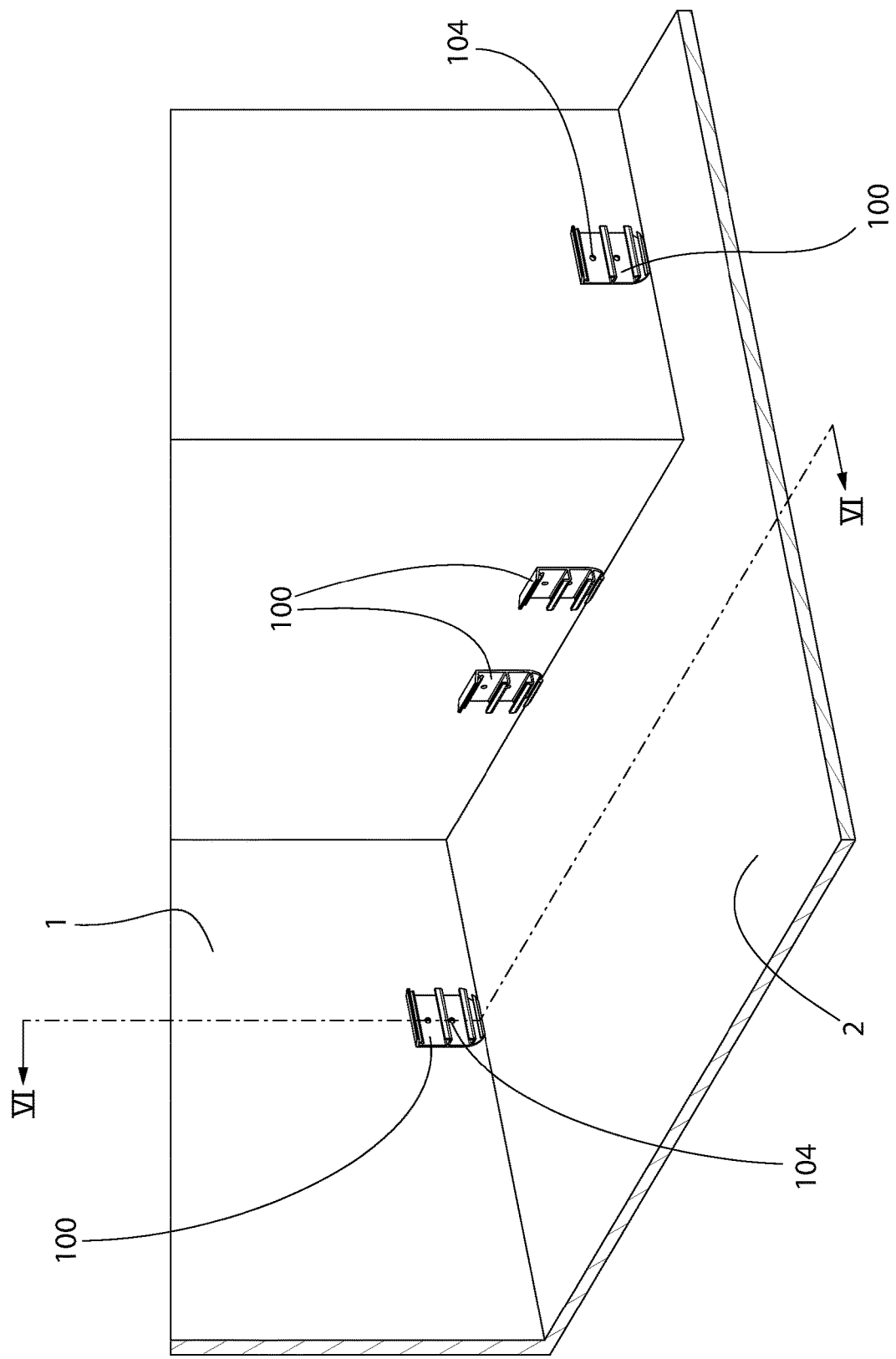
FIG. 6A is a perspective view of the wall and floor of FIG. 5A with a plurality of the mounting brackets of the cable management system of FIG. 1 coupled thereto.
Figure 6B:
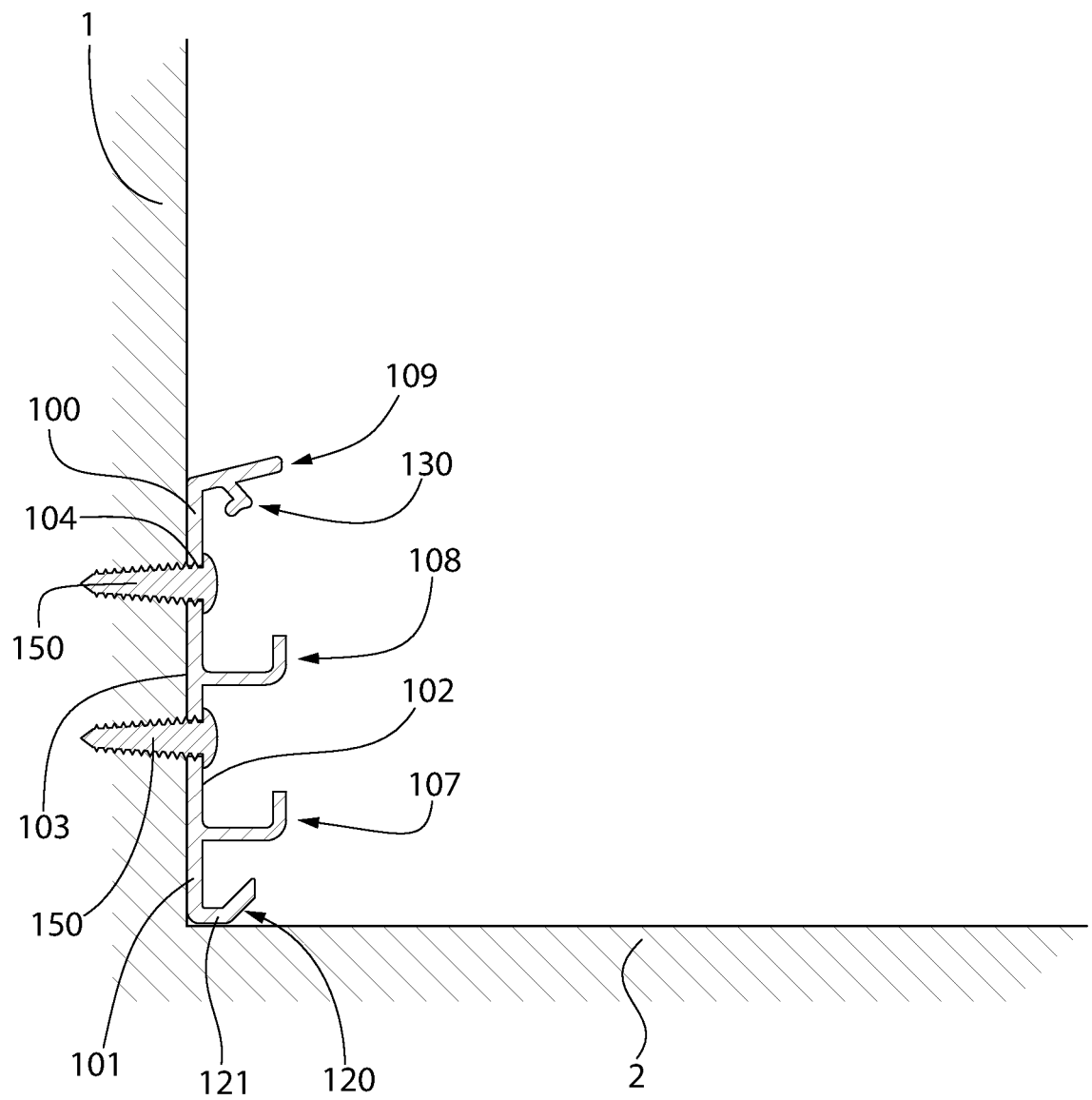
FIG. 6B is a cross-sectional view taken along line VI-VI of FIG. 6A.

Referring to FIGS. 6A and 6B, the room is illustrated with the mounting brackets 100 coupled to the wall 1. As noted previously, fixedly coupling the mounting brackets 100 to the wall 1 may be achieved by inserting a coupling member such as without limitation a threaded fastener 150 such as a screw, a nail, or the like through the mounting aperture 104 of the mounting bracket 100 to threadably engage the wall and/or structural stud behind the wall. Of course, fasteners 150 broadly includes toggle bolts, drywall anchors, or similar fasteners allowing the mounting bracket 100 to be secured to hollow portions of a drywall board type walls 1 such that the mounting brackets need not be mounted directly to a vertical structural studs behind the wall in the wall cavity. Moreover, instead of fasteners for the coupling member, the mounting brackets 100 could be coupled to the wall 1 using adhesive such as adhesive strips, tape, glue, or the like. Thus, the term "coupling member" should be broadly construed as any element, component, or product capable of fixedly securing the mounting bracket 100 to wall 1. Accordingly, the invention is not intended to be limited by the manner in which the mounting brackets 100 are coupled to the wall 1 in various embodiments. In the exemplified embodiment, there are four of the mounting brackets 100 illustrated coupled to the wall 1. As many mounting brackets 100 as may be needed depending on the size and shape of the wall 1 on which the cable management system 10 is being installed may be used in various different embodiments.

The mounting brackets 100 are coupled to the wall 1 so that the rear surface 103 of the rear wall 101 is adjacent to and in abutting contact with the wall 1. A flat-to-flat interface is formed between the rear wall of the mounting bracket 100 and the wall surface. Furthermore, the first portion 121 of the first connection element 120 is adjacent to or in abutting contact with the floor 2. However, in other embodiments the mounting bracket 100 may be positioned higher up on the wall so that the first connection element 120 is spaced from and above the floor 2. Furthermore, the first, second, and third ledges 107, 108, 109 extend in a direction away from the wall 1 so that they can be used to support the cables 400 as described below.

Figure 7A:
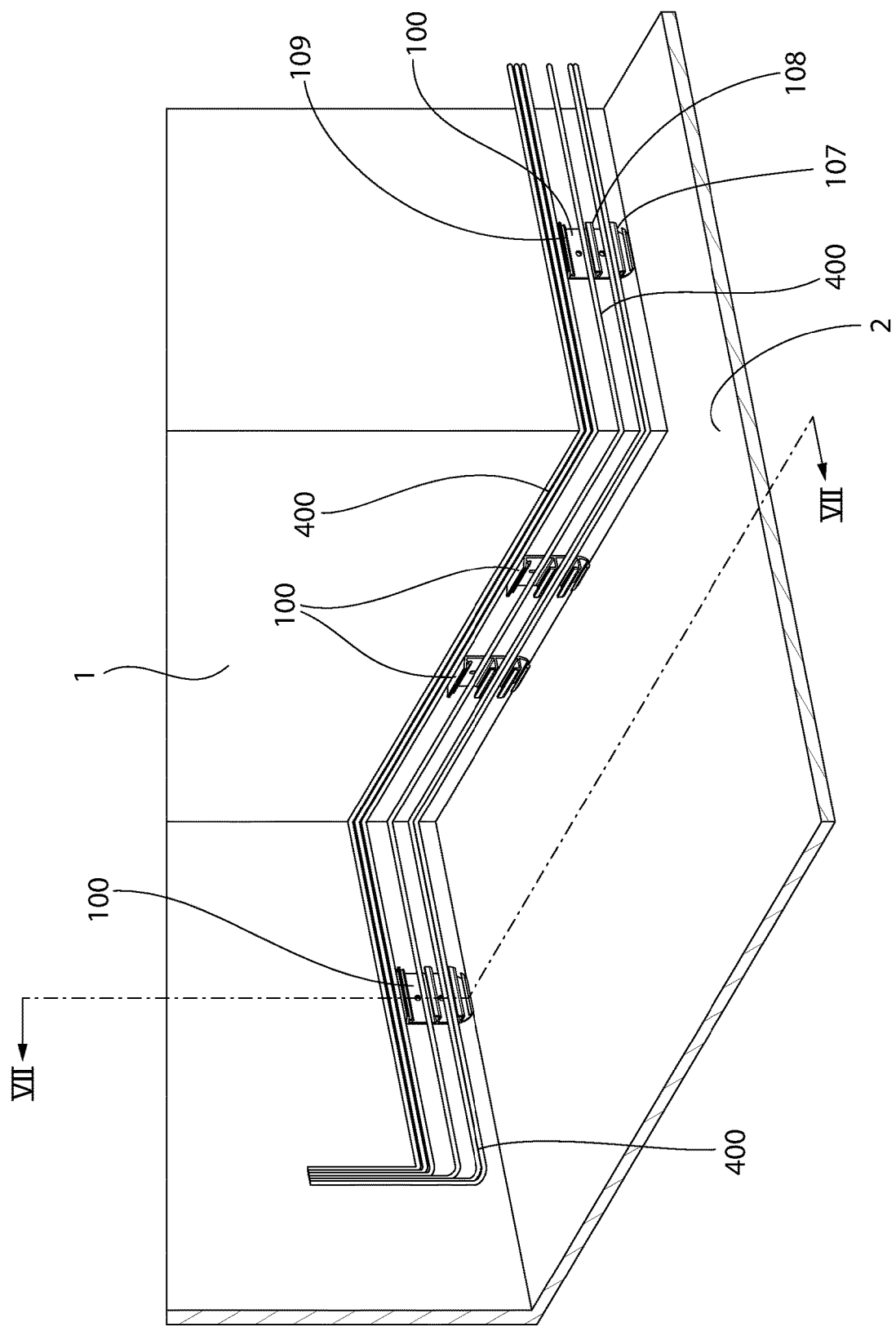
FIG. 7A is a perspective view of the wall and floor with the mounting brackets thereon of FIG. 6A, and also illustrating a plurality of cables supported by the mounting brackets.
Figure 7B:
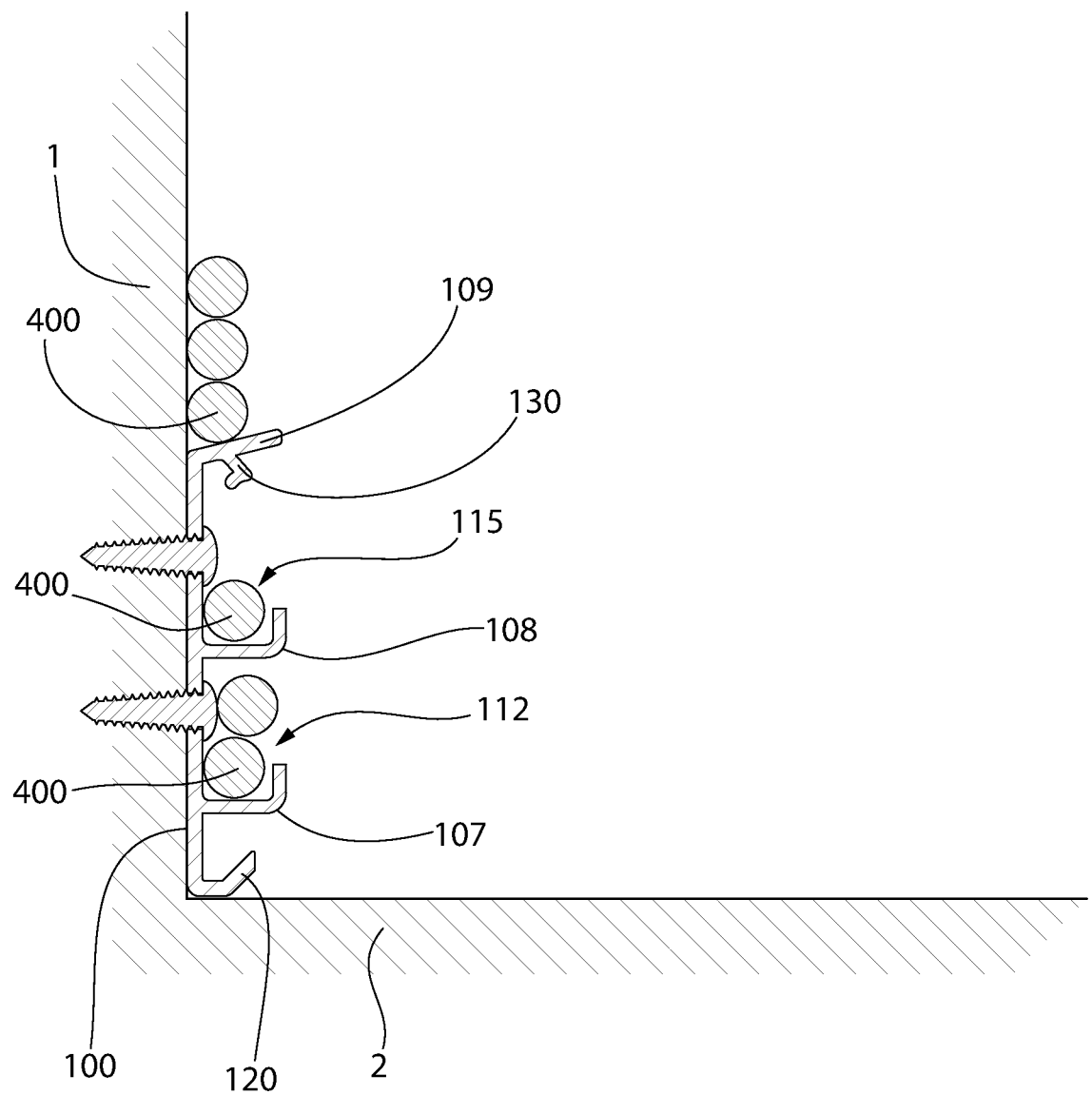
FIG. 7B is a cross-sectional view taken along line VII-VII of FIG. 7A.

Referring to FIGS. 7A and 7B, after the mounting brackets 100 are coupled to the wall(s) 1, the cables 400 are next positioned along the wall 1 so as to extend from a signal source point (which may be a power source, an Internet source, a router, an audio/visual source, or the like) to an end use point (which may be an electronic device such as a computer, a television, sound system, or the like). As the cables 400 are run along the wall(s) 1, the cables 400 are supported by the first, second, and third ledges 107, 108, 109 of the mounting brackets 100. Thus, in the illustrated embodiment, without limitation, there may be two cables 400 supported by the first ledges 107 and located within the first cable receiving regions 112 of the mounting brackets 100, there is one cable 400 supported by the second ledges 108 and located within the second cable receiving regions 115 of the mounting brackets 100, and there are three cables supported by the third ledge 109 in third cable receiving regions 119. Thus, because the mounting brackets 100 have the ledges 107, 108, 109, it may be possible to run the cables 400 along the wall 1 without using any cable staples, cord clips, wire clips or other cord securing fasteners that are traditionally used for this purpose (although, of course, some securing fasteners/staples or wire/cable ties could be used in addition to the ledges 107, 108, 190 of the mounting brackets 100 in some embodiments, particularly along the inner and outer corners of the wall 1) if additional securement is necessary.

Figure 8A:
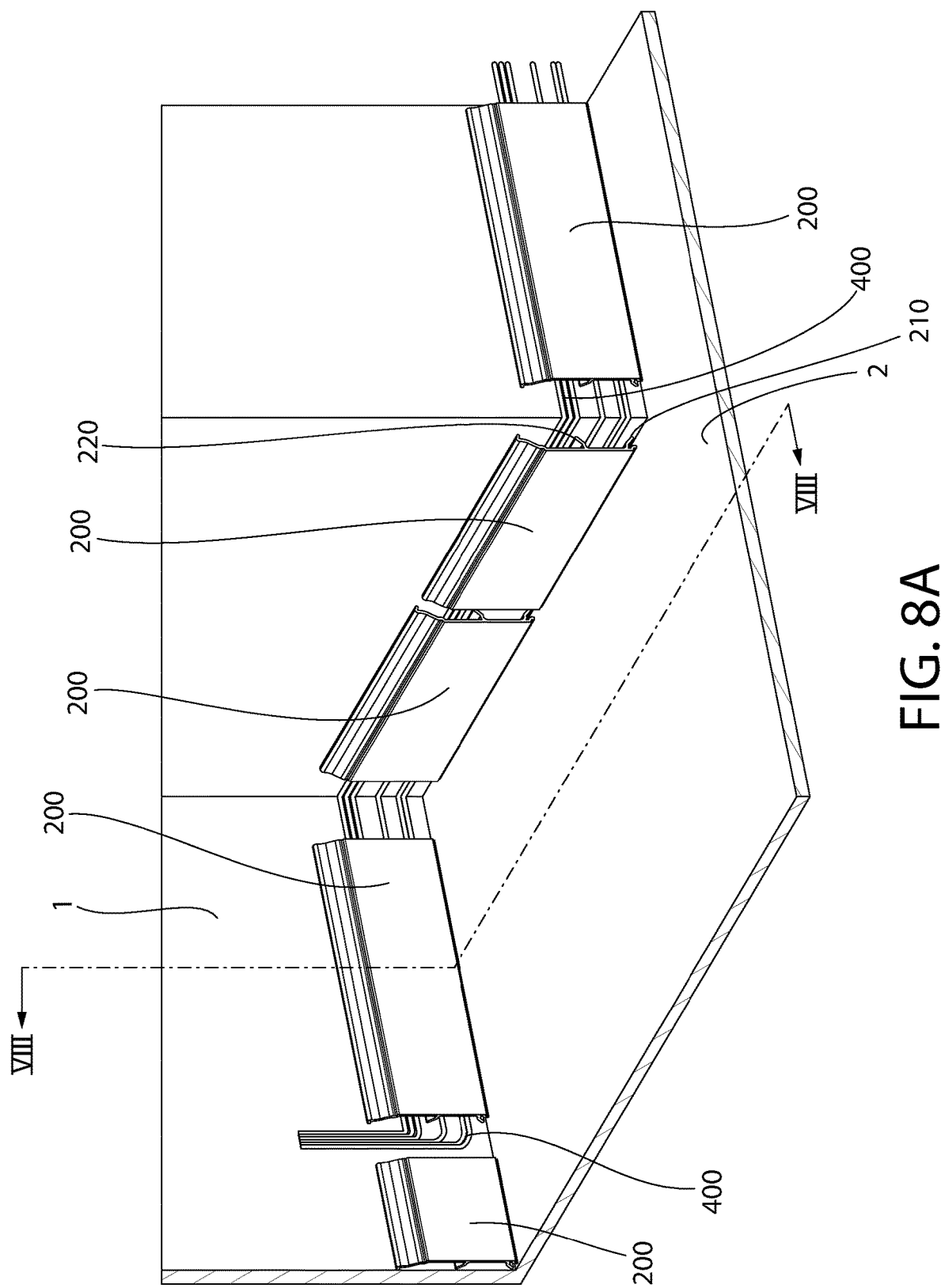
FIG. 8A is a perspective view of the wall and floor with the mounting brackets thereon and the cables supported by the mounting brackets of FIG. 7A, and also illustrating a plurality of the cover members of the cable management system of FIG. 1 coupled to the mounting brackets.
Figure 8B:
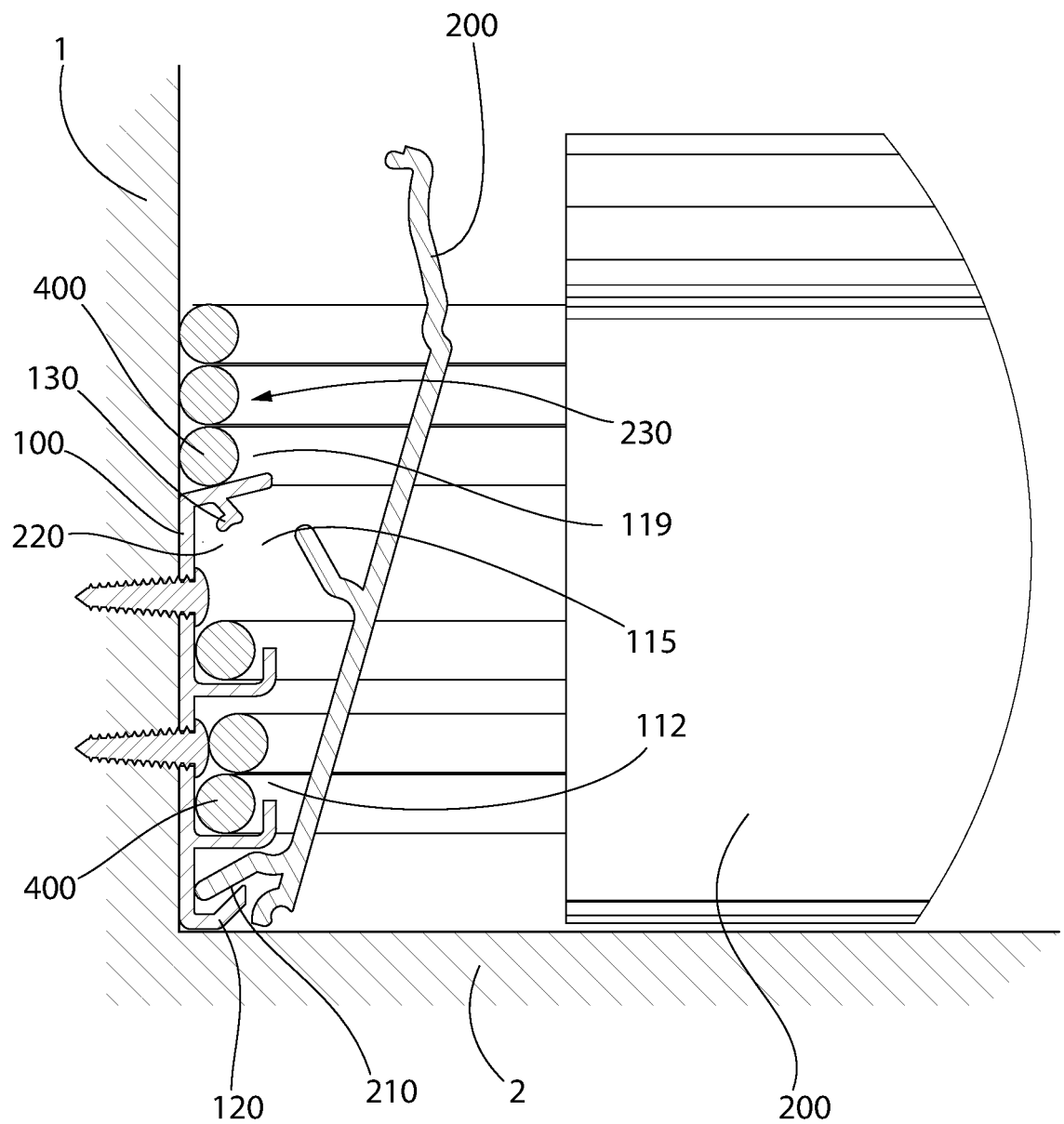
FIG. 8B is a cross sectional view showing the cover member in a partially installed state.
Figure 8C:
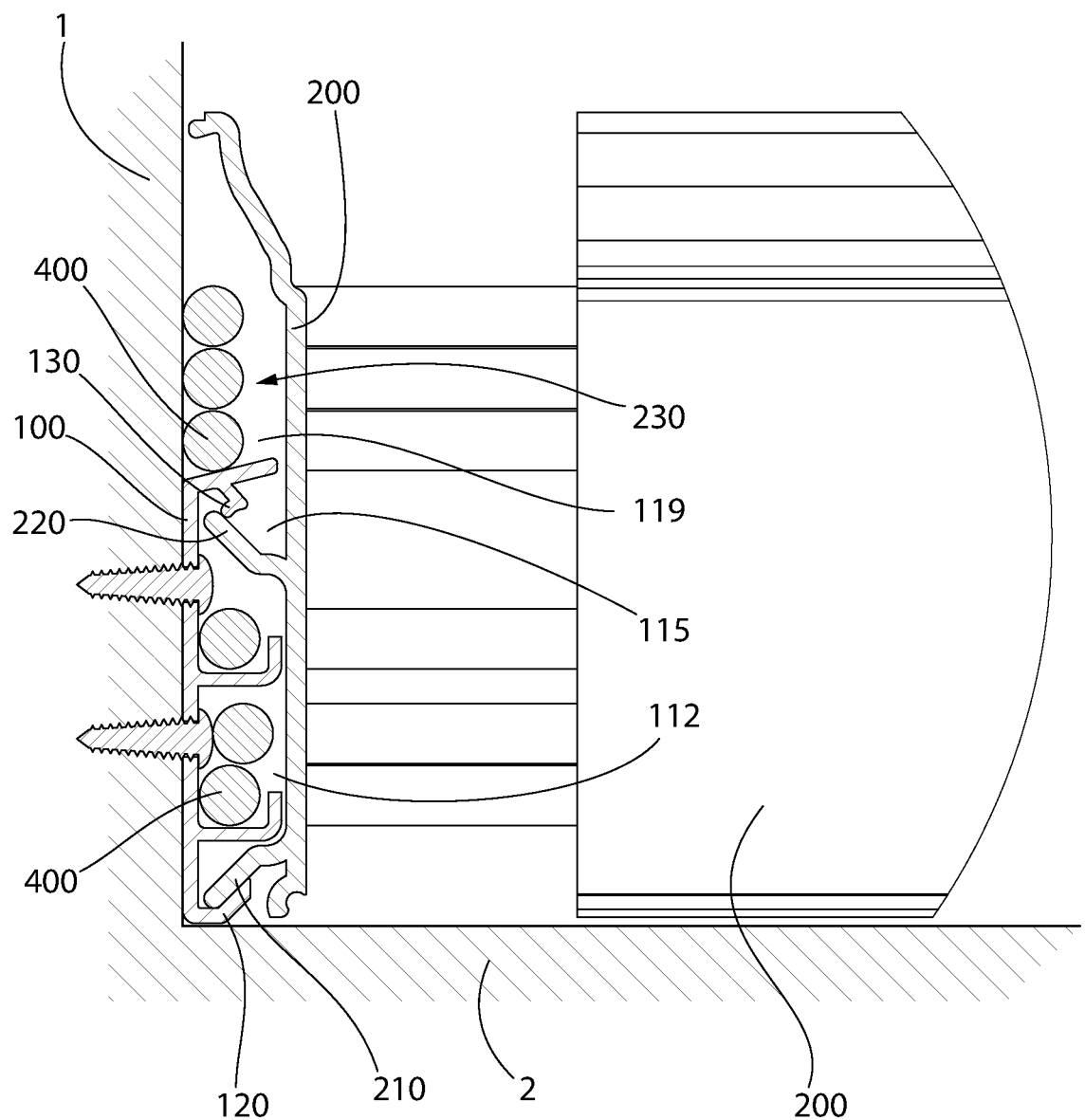
FIG. 8C is a cross-sectional view taken along line VIII-VIII of FIG. 8A showing the cover member in a fully installed state.

Next, as shown in FIGS. 8A-B, the cover members 200 are then coupled to the mounting brackets 100. This may be achieved by first placing or inserting the first connection element 210 of the cover member 200 into the space or receptacle 140 between the second portion 122 of the first connection element 120 of the mounting bracket 100 and the rear wall 101 of the mounting bracket 100. Concurrently, first connection element 120 of mounting bracket 100 is inserted into receptacle 231 of cover member 200. The mounting bracket first connection element 120 engages first connection element 210 of cover member 200. In one embodiment, the foregoing insertion steps may be performed by first holding and positioning the cover member 200 at an oblique angle adjacent to the mounting bracket 100 with the bottom end of the cover member contacting the mounting bracket while the top end of the cover member is spaced apart from the mounting bracket being leaned inwards towards the room away from the wall 1. This initial obliquely angled position of the cover member is shown in FIG. 8B.

Next, the cover member 200 is rotated relative to the mounting bracket 100 about the first connection element 210 (engaged by first connection element 120 of the mounting bracket 100) until the second connection element 220 of the cover member 200 engages the second connection element 130 of the mounting bracket. More specifically, the cover member 200 rotates about mutually engaged bearing surface 107B defined by first connection element 210 of the cover member and bearing surface 107A defined by first connection element 210 of mounting bracket 100. The engaged bearing surfaces 107A, 107B define the cover member pivot axis as previously described herein. Continued rotation of the cover member 200 will cause the second connection element 220 of the cover member 200 to engage and snap past the second connection element 130 on the uppermost third ledge 109 of the mounting bracket 100, thereby achieving a readily detachable frictional inference snap-fit coupling of the cover member 200 to the mounting bracket 100 shown in FIG. 8C. Both or at least one of the mounting bracket and cover second connection elements 130, 220 and 220 respectively may be preferably resiliently structured and deflectable/deformable to an extent which facilitates the snap-fit engagement.

When the cover members 200 are snap-fit coupled to the mounting brackets 100, the cables 400 are concealed in cavity 230 collectively defined by and located between the cover members 200 and the wall 1. Thus, the cover members 200 cover the cables 400 and prevent them from being seen by a user standing in the room. In the exemplified embodiment, there are spaces between the cover members 200 along the wall 1, and thus there are regions along the wall 1 where the cables 400 remain exposed. However, in other embodiments the cover members 200 may be positioned in a side-by-side abutting manner so as to cover the entirety of the cables 400 and form a seamless and continuous baseboard.

One benefit of this present cable management system set up is that it is reasonably easy for a user to access the cables 400 at a later time, simply by detaching one or more of the cover members 200 from the mounting brackets 100. This can be achieved by pulling the cover members 200 away from the wall 1. In some embodiments, a tool such as a flathead screwdriver may be used to facilitate the decoupling of the cover members 200 from the mounting brackets 100.

Figure 9A:
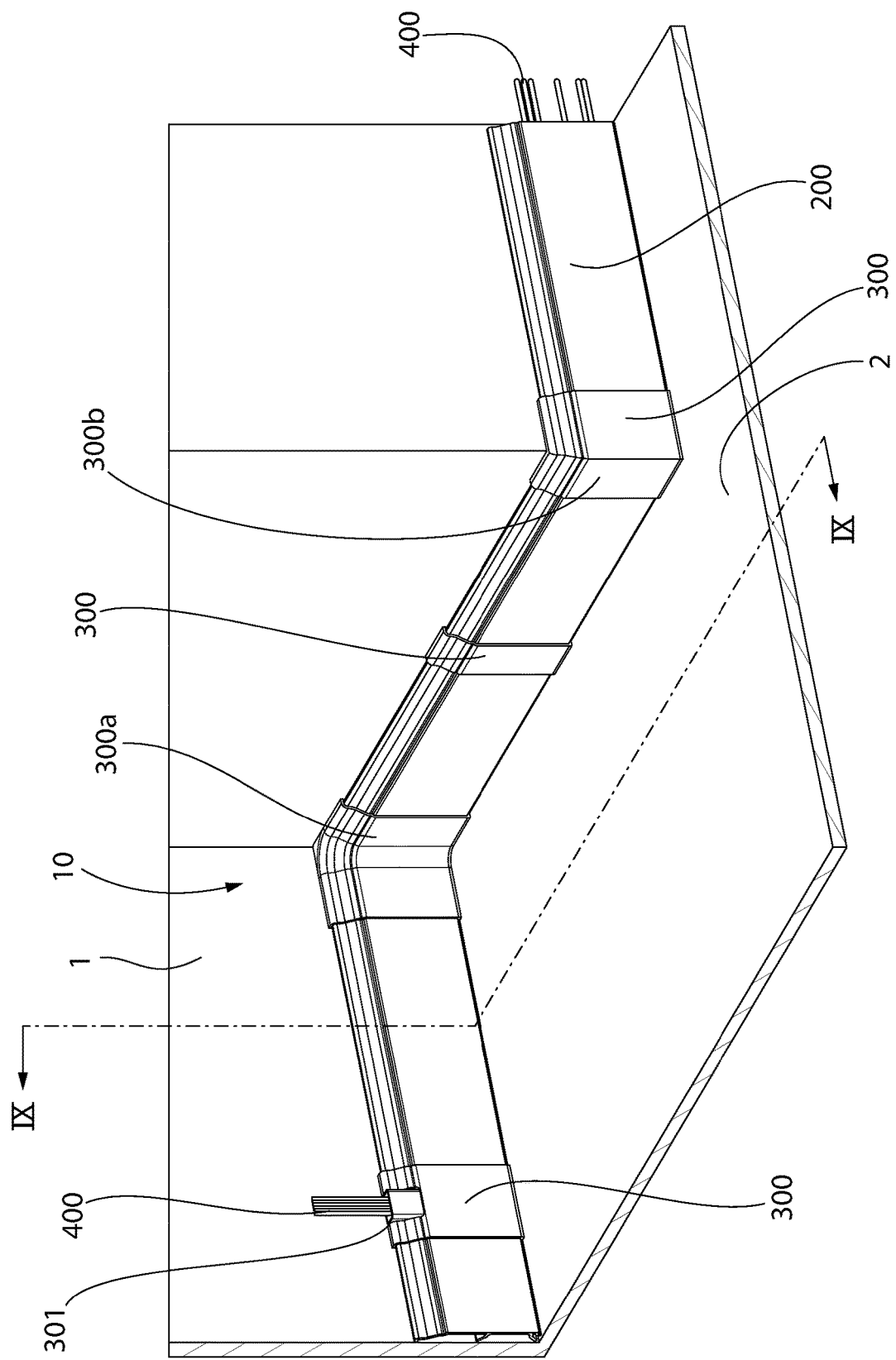
FIG. 9A is a perspective view of the wall and floor with the mounting brackets thereon, the cables supported by the mounting brackets, and the cover members coupled to the mounting brackets as shown in FIG. 8A, and also illustrating coupler members coupled to the cover members.
Figure 9B:
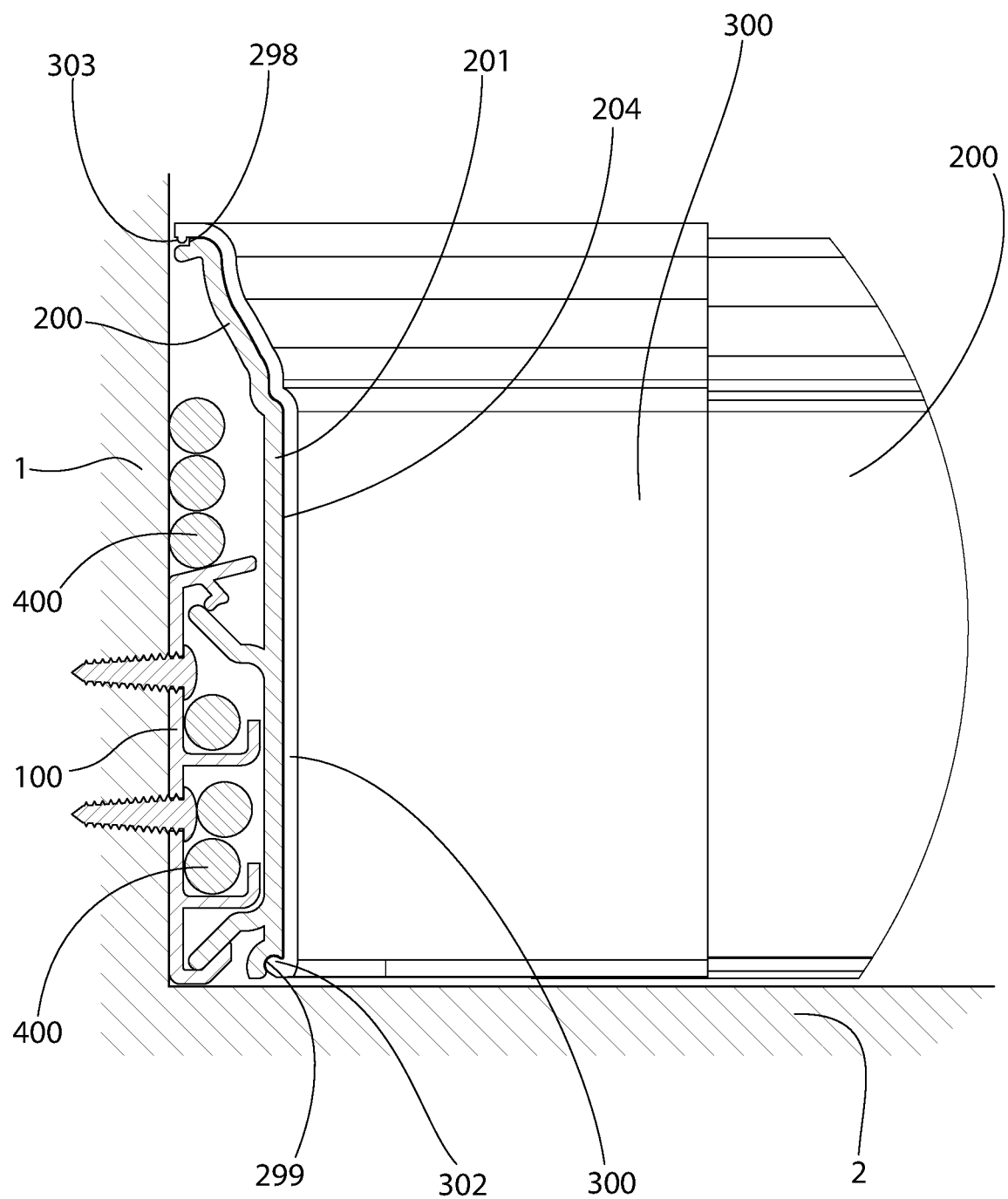
FIG. 9B is a cross-sectional view taken along line IX-IX of FIG. 9A.

Referring to FIGS. 9A and 9B, the next step in the installation of the cable management system 10 in the mounting scenario case where adjacent cover members 200 are not directly abutted to each other (see, e.g. FIG. 8A) is to attach the coupler members 300 to the cover members 200 so that the couple members 300 extend across the gaps between the cover members 200. Thus, once the coupler members 300 are attached to the cover members 200, the cables/wires 400 are no longer exposed at all, thus creating a clean aesthetic. As seen in FIG. 9B, the coupler members 300 have a shape that is complementary configured to and corresponds with the shape of the cover members 200 so that the coupler members 300 can be placed directly against the front surface 204 of the front wall 201 of the cover members 200. The coupler members 300 have a pivot tab 302 at the bottom and a locking tab 303 at the top (see also FIGS. 11 and 12). Thus, to couple the coupler members 300 to the cover members 200, the pivot tab 302 is inserted into a pivot notch 299 in the cover member 200 and then the top of coupler member 300 is rotated relative to and toward the cover member 200 until the locking tab 303 engages a locking notch 298 at the top of cover member 200 formed by a stepped shoulder (see also FIG. 4B). As noted previously and shown in FIG. 9A, at least one of the coupler members 300 may include a cord port 301 so that the cords 300 can pass therethrough and into the space between the cover members 200 and coupler members 300 and the wall 1.

FIG. 10 is a view of the cable management system 10 installed in a room in an identical manner to that which is shown in FIGS. 1 and 9A, except in FIG. 10 a wall molding 500 is positioned along the inside corner of the wall 1. In this embodiment, the cables (not visible in this view) run along the inside corner of the wall 1 behind the wall molding 500. In this embodiment, the wall molding 500 is a rectangular shaped molding, although it could take on other shapes in other embodiments.

Figure 11:
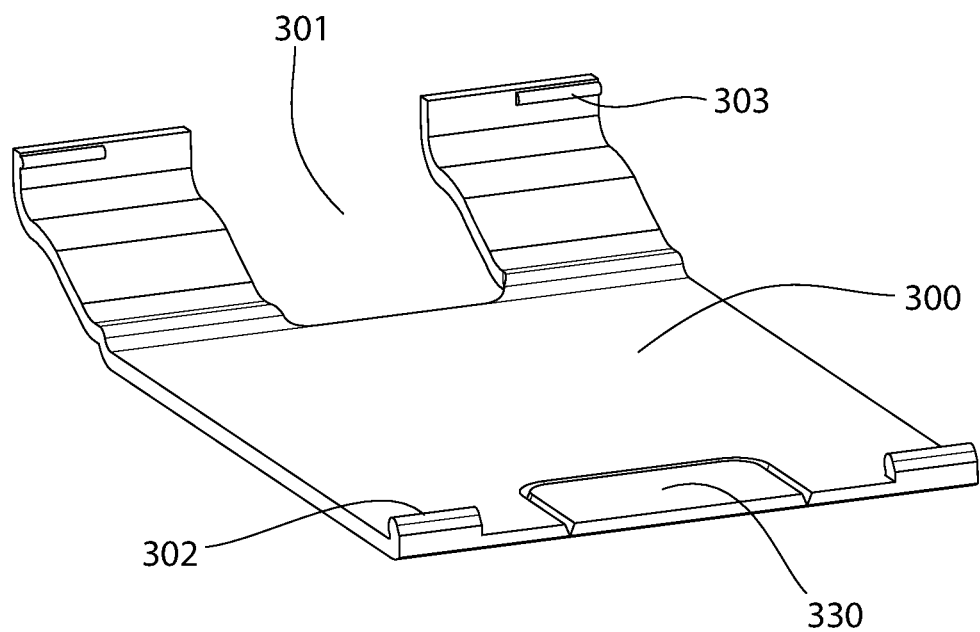
FIG. 11 is a perspective view of a coupler member having a cord port in accordance with an embodiment of the present invention.

Referring to FIGS. 10 and 11, FIG. 11 illustrates one of the coupler members 300 with the cord port 301. The cord port 301 may be rectangular in shape so that it can receive the wall molding 500 therethrough. The coupler member 300 may also include a knock-out 330 along the bottom that can be worked back and forth with pliers to remove the knock-out 330. This may be desired so that the rectangular shaped wall molding 500 can be run along the floor 2 instead of the wall 1 and still be coupled to the coupler member 300. Coupler member 300 includes laterally spaced apart pivot tabs 302 at bottom and locking tabs 303 at top as previously described herein.

Figure 12:
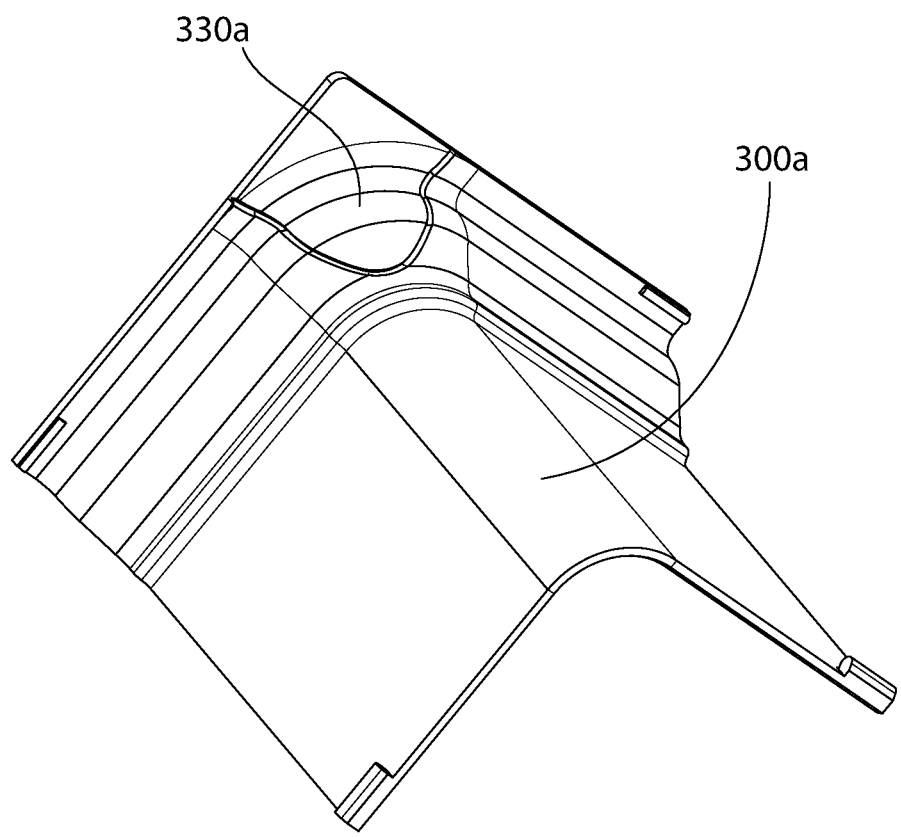
FIG. 12 is a perspective view of an inside corner coupler member in accordance with an embodiment of the present invention.

Referring to FIGS. 10 and 12, FIG. 12 illustrates one of the inner coupler members 300a. The inner coupler member 300a may include a knock-out 330a that can be worked back and forth so that it can be torn from the rest of the inner coupler member 300a. As a result, the rectangular shaped wall molding 500 can pass through the inner coupler member 300 at the location where the knock-out 330a is removed (as shown in FIG. 10). Inner coupler member 330a includes the same pivot tabs 302 at bottom and locking tabs 303 at top like coupler members 300.

FIGS. 13A-16B illustrate another cable management system 20 that can be installed on the wall 1 in the room. First, referring to FIGS. 13A and 13B, a track member 600 of the cable management system 20 is illustrated coupled to the wall 1. Although the track member 600 is coupled to the wall 1 in the exemplified embodiment, it could be coupled to the floor 2 or the ceiling in other embodiments. Moreover, the track member 600 could be coupled to the wall 1 at locations other than directly adjacent to the floor 2, such as being coupled to the wall 1 at some elevation above the floor 2. In the exemplified embodiment, the track member 600 comprises an L-shaped body portion 610 having a rear wall 611 and a bottom wall 612 and a cover portion 620 that is integrally formed with the body portion 610 and pivotable relative to the body portion 610 between a closed state (FIG. 13B) and an open state (FIG. 14B). Specifically, the cover portion 620 is coupled to the body portion 601 via a living hinge 630, which allows the cover portion 620 to be repetitively rotated/pivoted relative to the body portion 601 between the closed and open states. Although in the exemplified embodiment the hinge 630 is a living hinge so that the cover portion 620 and the body portion 610 are integrally formed as a monolithic structure, the invention is not to be so limited and in other embodiments the cover portion 620 and the body portion 610 may be separate components that are attached by a separate hinge component. When cover portion 620 is closed, track member 600 forms a quarter-round profile in transverse cross section which fits into the corner formed between the wall 1 and floor 2.

The body portion 610 has a first locking feature 615 and the cover portion 620 has a second locking feature 625 that mates with the first locking feature 615 to lock the cover portion 620 into the closed state. The mating locking features may be generally considered hook-shaped which form an interlock. To transition the cover portion 620 from the closed state to the open state, a tool such as a flathead screwdriver can be inserted into the notch 626 in the outer surface of the cover portion 620 and then torqued to force the second locking feature 625 of the cover portion 620 to become free from the first locking feature 615 of the body portion 610. At that point, the cover portion 620 can be rotated upwardly about the living hinge 630 from the closed state to the open state. When in the closed state, the body portion 610 and the cover portion 620 collectively define a cavity 605 within which cables, wires, cords, and the like can be stored out of view. When in the open state, a user may gain access to the cables, wires, cords, and the like stored in the cavity 605.

Figure 13A:
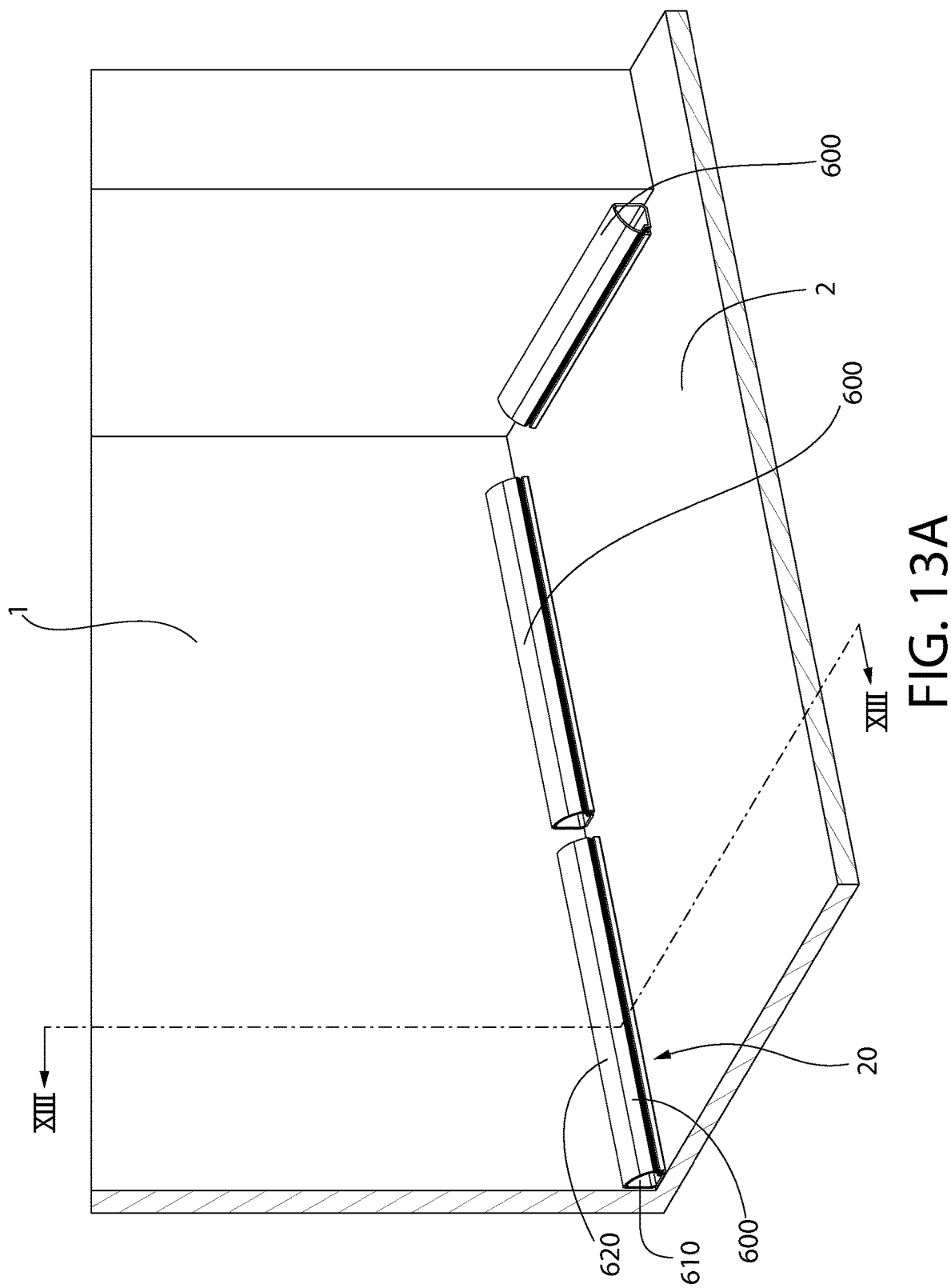
FIG. 13A is a perspective view of a wall and a floor with a plurality of track members of a cable management system according to a second embodiment of the present invention coupled thereto, wherein the cable management system is in a closed state.
Figure 13B:
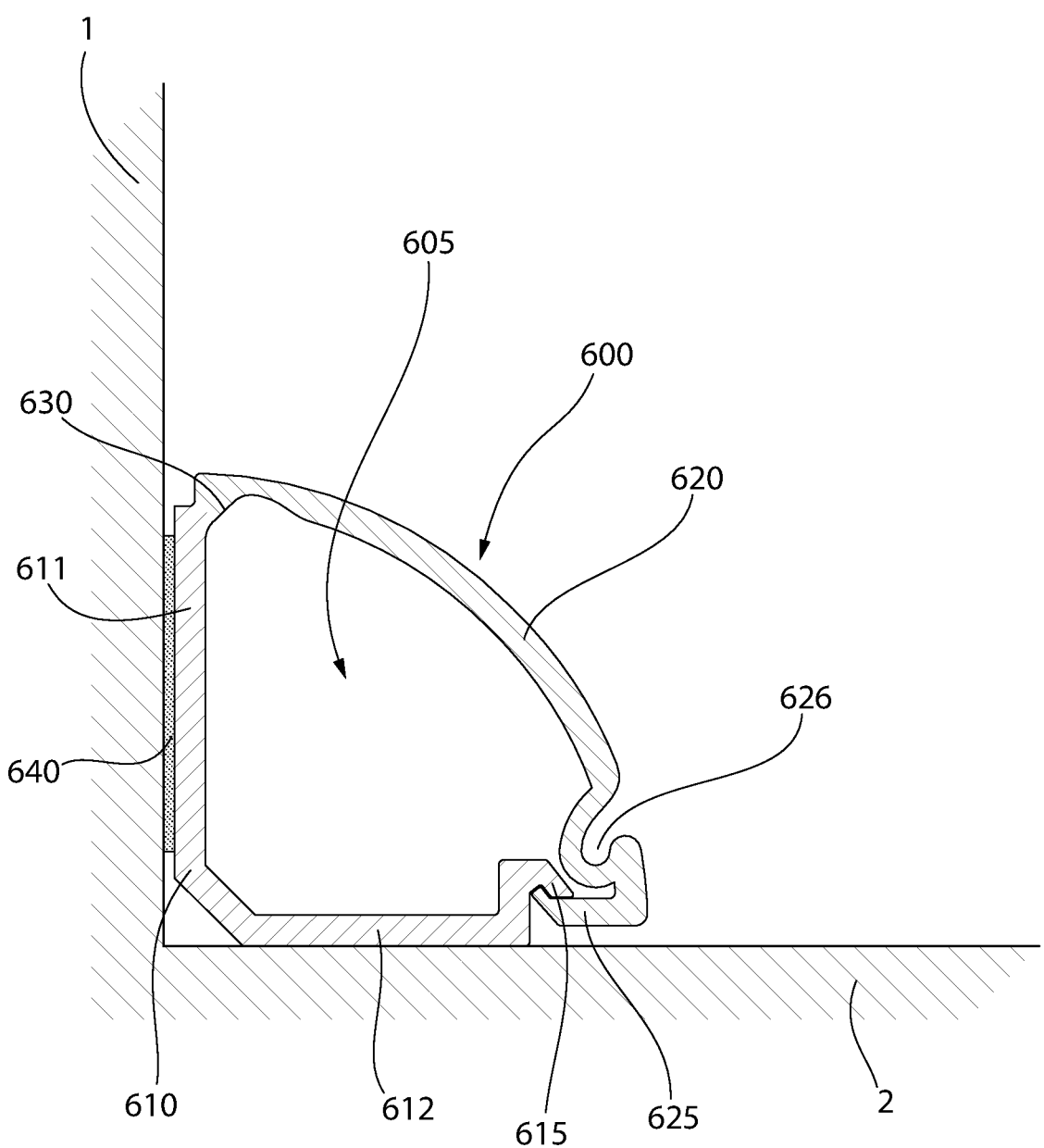
FIG. 13B is a cross-sectional view taken along line XIII-XIII of FIG. 13A.

As seen in FIG. 13B, in the exemplified embodiment the track member 600 may be coupled to the wall 1 using an adhesive. For example, in the exemplified embodiment an adhesive member 640 is attached to the wall 1 and to the rear wall 611 of the body portion 610 of the track member 600. The track member 600 may be sold with the adhesive member 640 already coupled thereto, but with a release liner covering the side that is configured to be attached to the wall 1. Thus, the adhesive member 640 may be a double-sided tape in some embodiments. In other embodiments, the adhesive member 640 may be a glue or the like. In still other embodiments, the adhesive member 640 may be omitted and the track member 600 may be coupled to the wall 1 using fasteners such as staples, nails, screws, bolts, or the like.

Figure 14A:
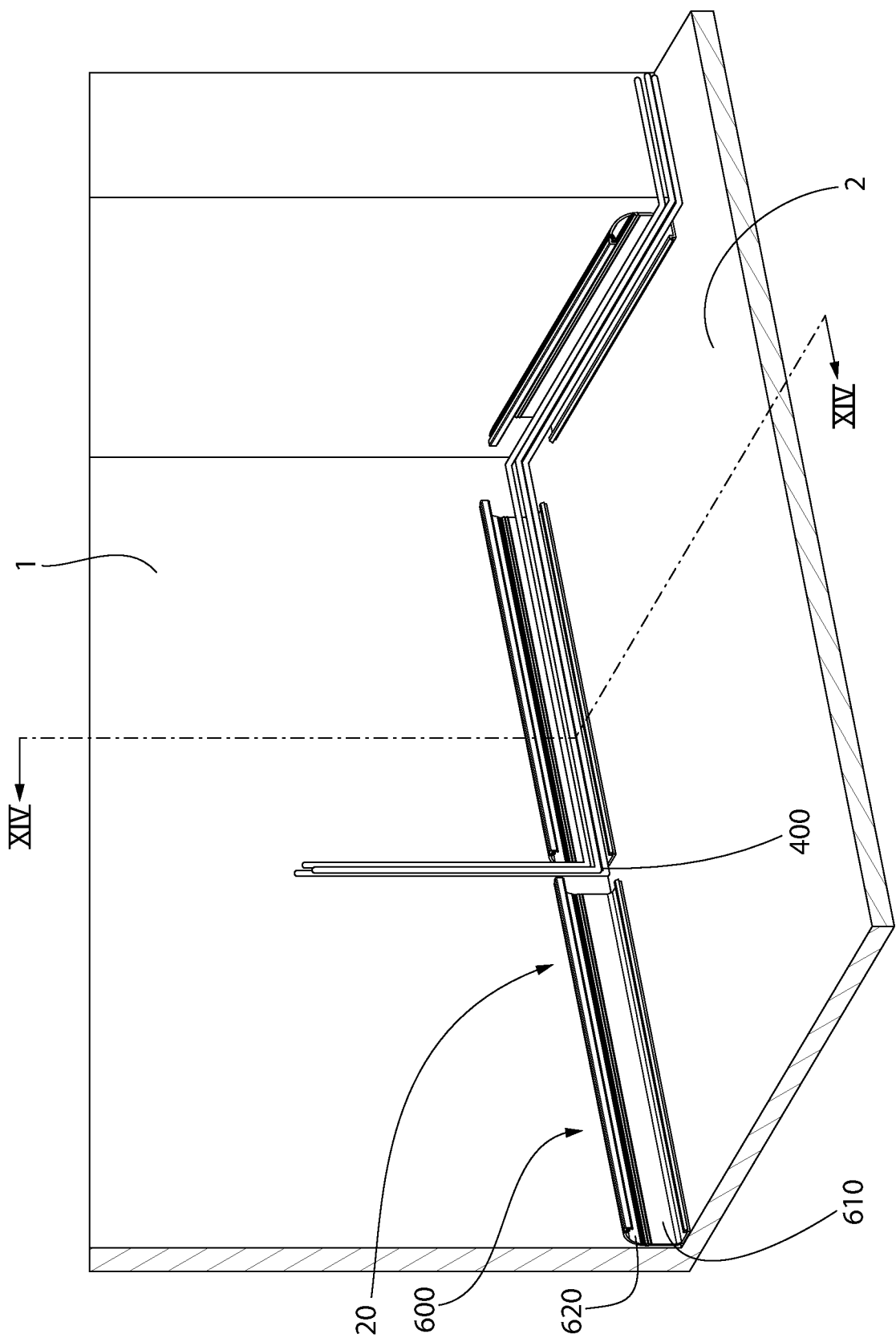
FIG. 14A is a perspective view the wall and floor with the track members of the cable management system of FIG. 13A coupled thereto, wherein the track members are in an open state and a plurality of cables are located within a cavity thereof.
Figure 14B:
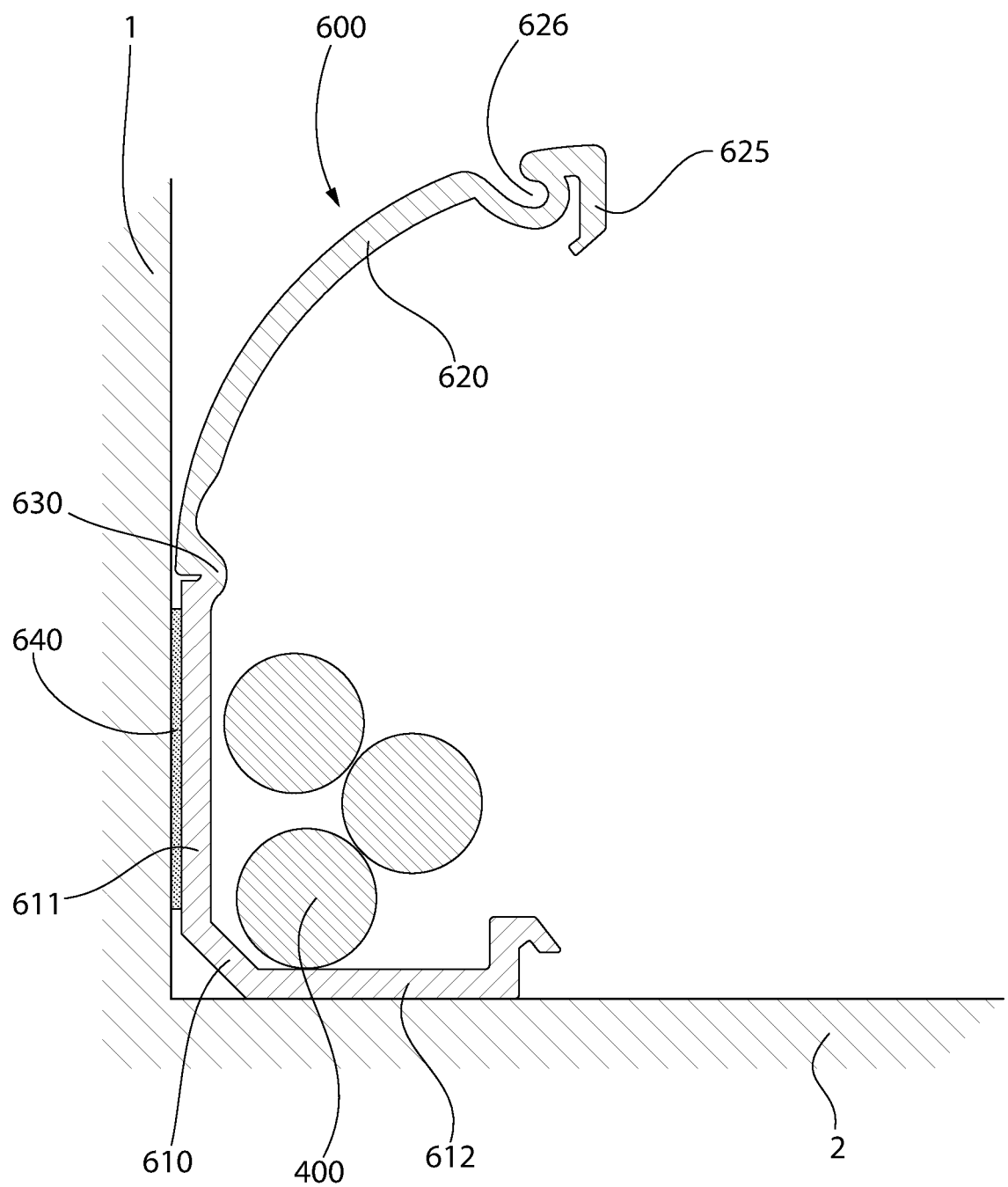
FIG. 14B is a cross-sectional view taken along line XIV-XIV of FIG. 14A.

FIGS. 14A and 14B illustrate the track member 600 with the cover member 620 in the open state so that cables 400 can be run along the wall 1 and placed into the cavity 605. Thus, as mentioned previously, to transition from the closed state of FIGS. 13A and 13B to the open state of FIGS. 14A and 14B, a tool can be inserted into the notch 626 and then torqued to un-mate the first locking feature 615 from the second locking feature 625. Once that is achieved, the cover portion 620 can be pivoted/rotated about the living hinge 630 into the open state, and then cables 400 can be run along the wall within the cavity 605.

Figure 15A:
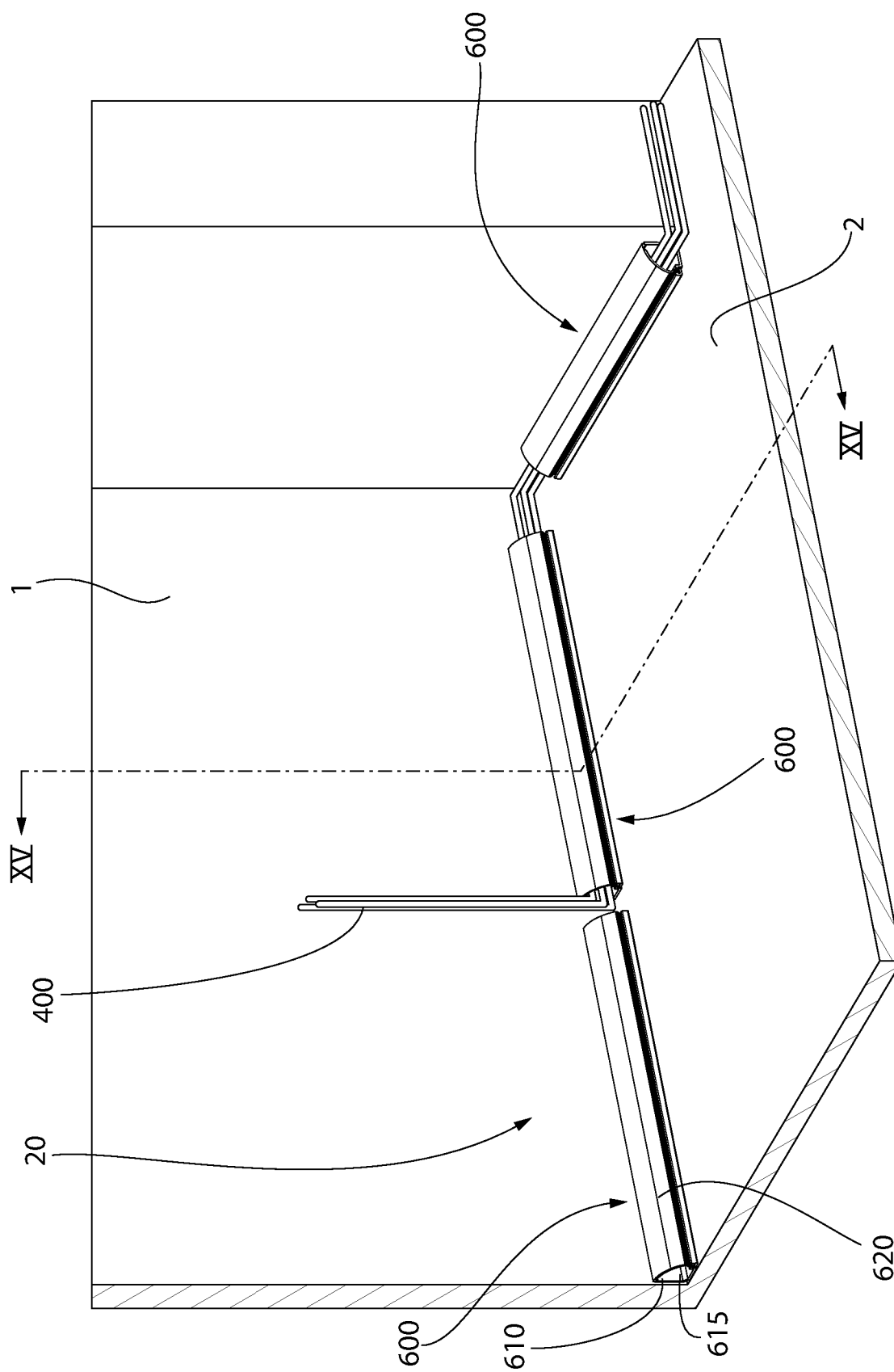
FIG. 15A is the perspective view of FIG. 14A, wherein the track members are in a closed state.
Figure 15B:
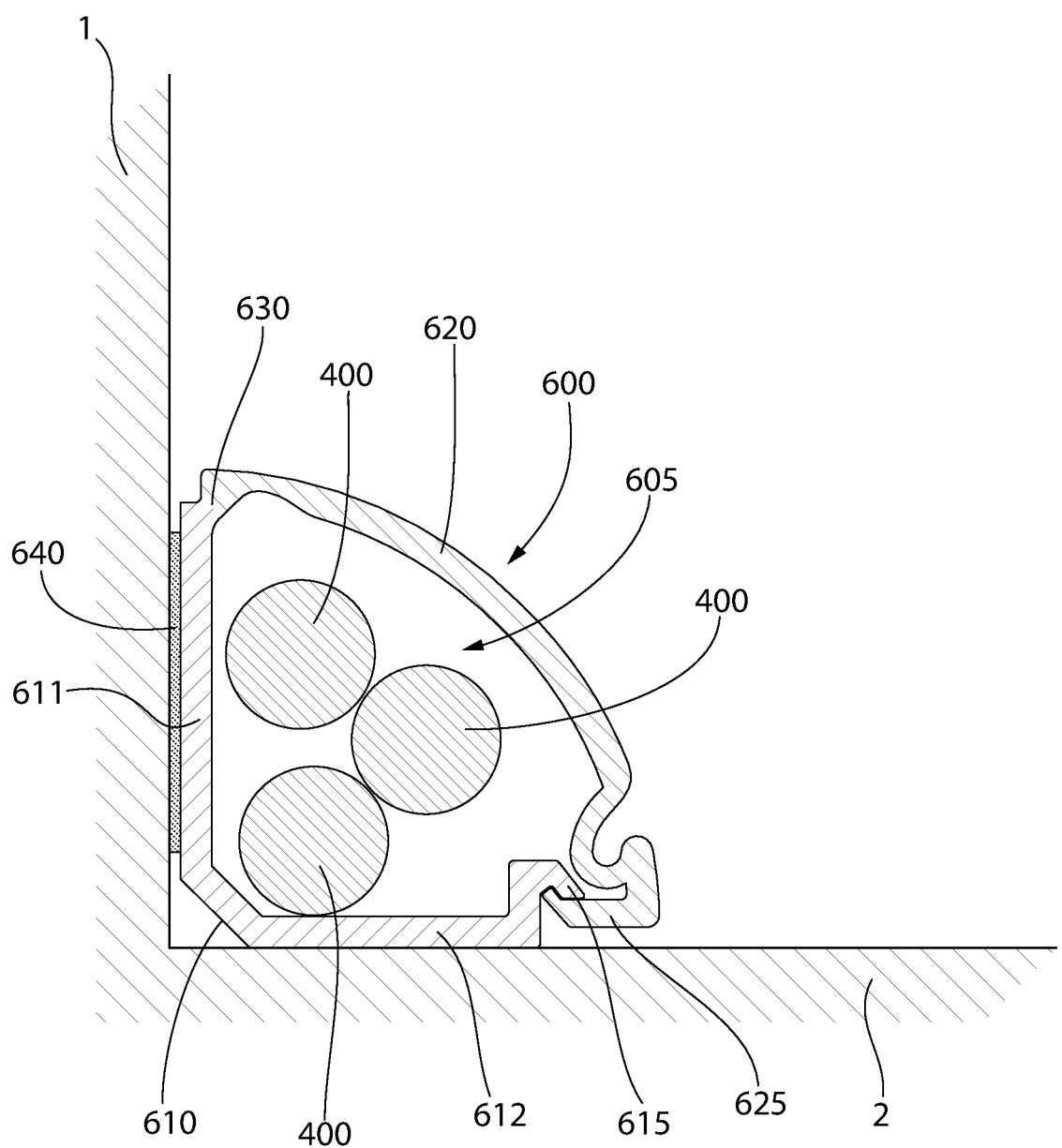
FIG. 15B is a cross-sectional view taken along line XV-XV of FIG. 15A.

Next, referring to FIGS. 15A and 15B, the cover members 620 can be transitioned or altered from the open state to the closed state. This is achieved by pivoting the cover members 620 about the pivot axis 630 so that the first and second locking members 615, 625 engage one another to lock the cover member 620 back in the closed state. At this point, the portions of the cables 400 that are located within the cavities 605 of the track members 600 are hidden from view. As can be seen, in the exemplified embodiment the track members 600 are positioned in a spaced apart manner along the wall 1, and thus even when the track members 600 are coupled to the wall 1 in the closed state, portions of the cables 400 extending between the adjacent track members 600 remain exposed. In other embodiments, the track members 600 may cover the entirety of the portion of the cables 400 that extends along the wall 1.

Figure 16A:
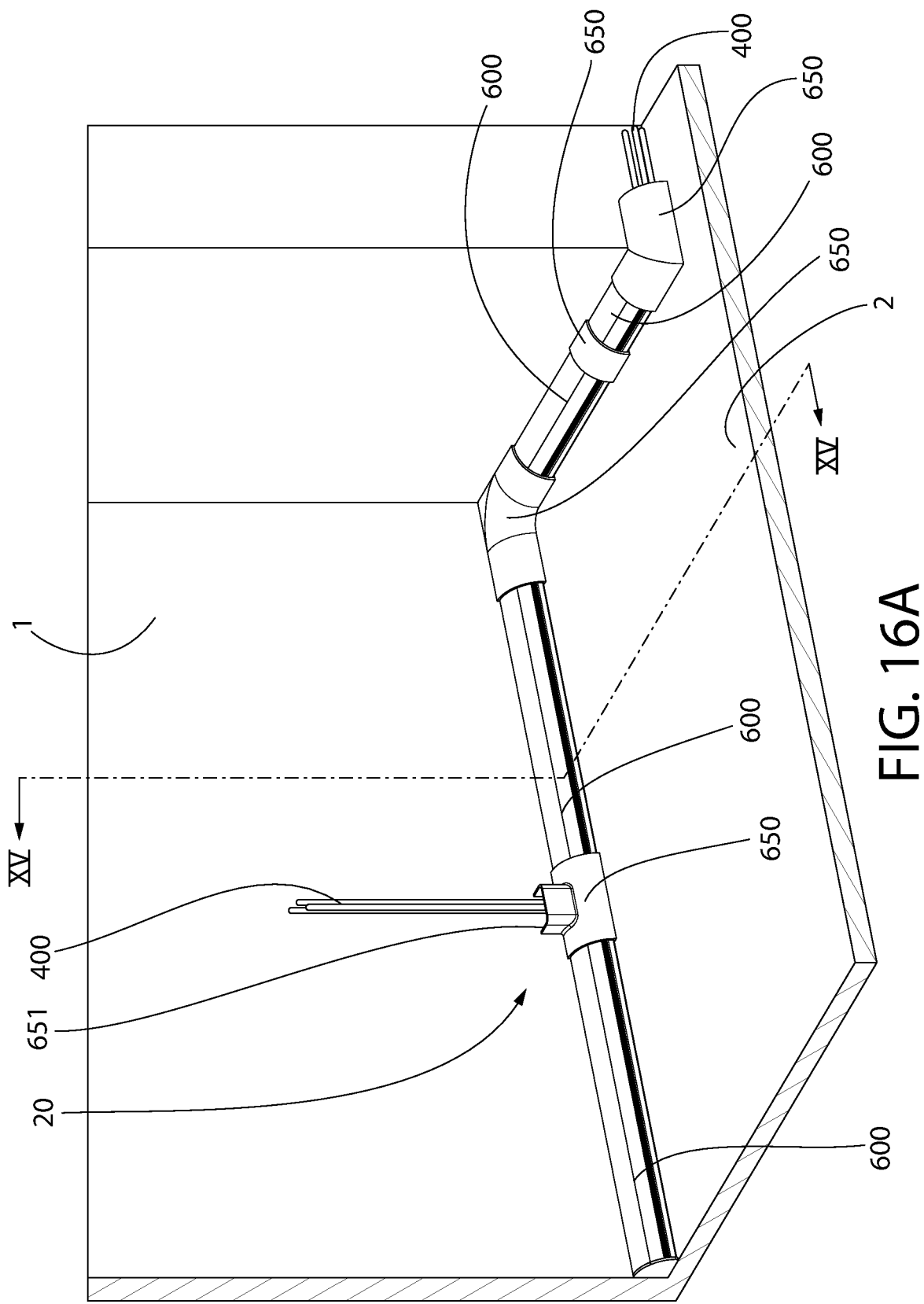
FIG. 16A is the perspective view of FIG. 15A, wherein coupler members are attached to the track members of the cable management system.
Figure 16B:
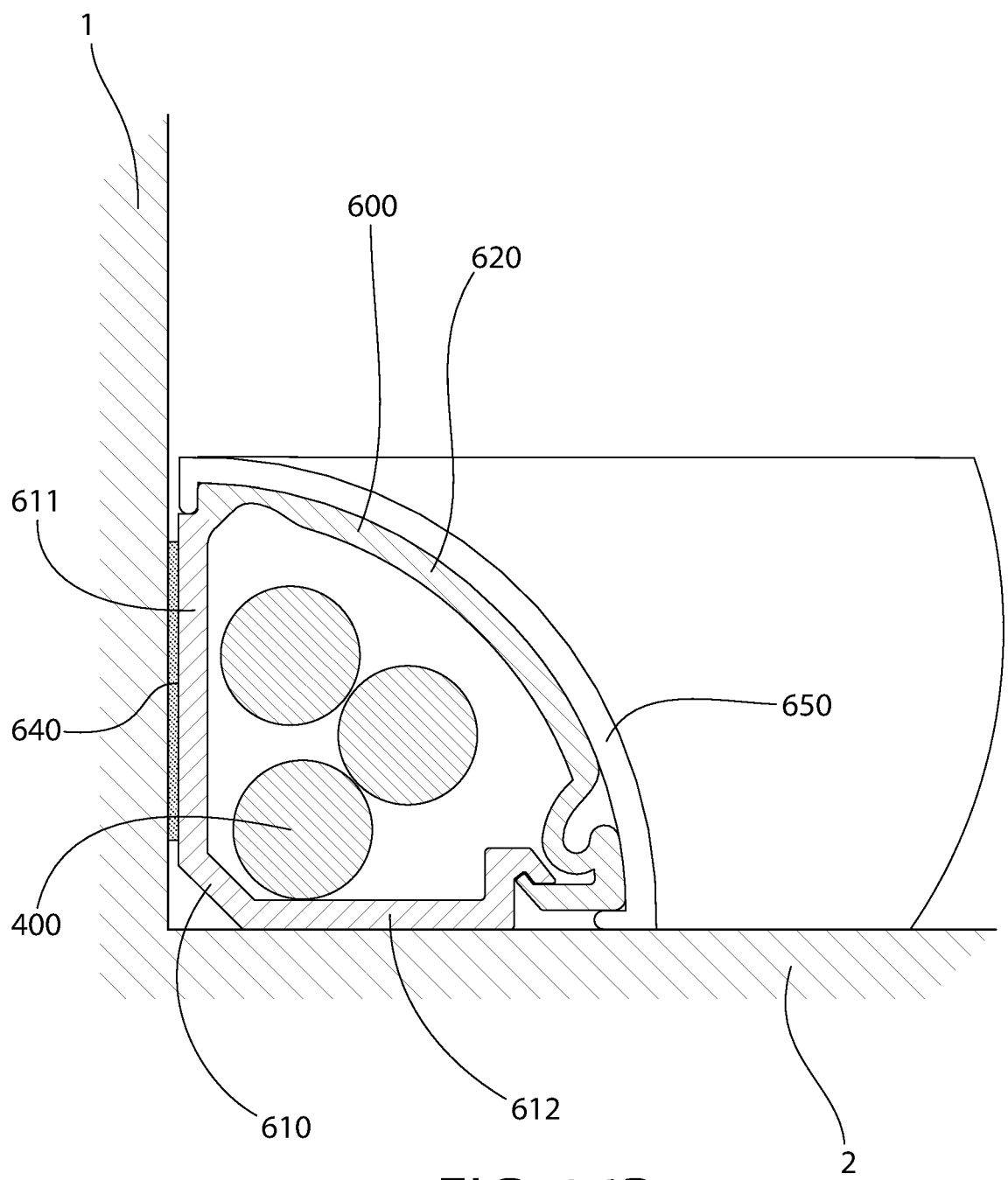
FIG. 16B is a cross-sectional view taken along line XVI-XVI of FIG. 16A.
Figure 17A:
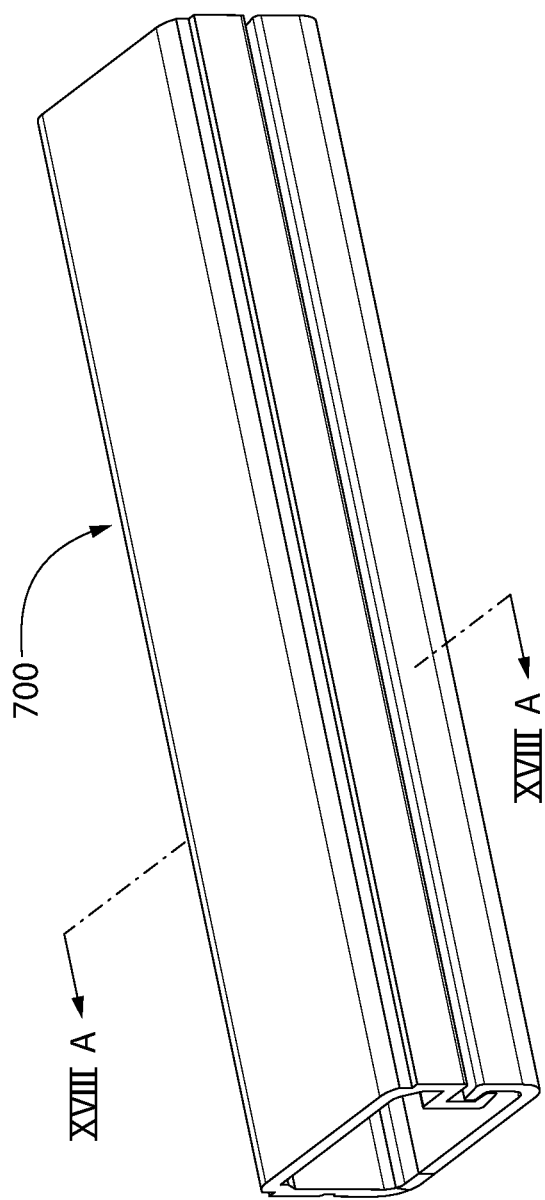
FIGS. 17A and 17B are perspective views of a track member of a cable management system according to a third embodiment of the present invention, wherein the track member is in a closed state in FIG. 17A and an open state in FIG. 17B.
Figure 17B:
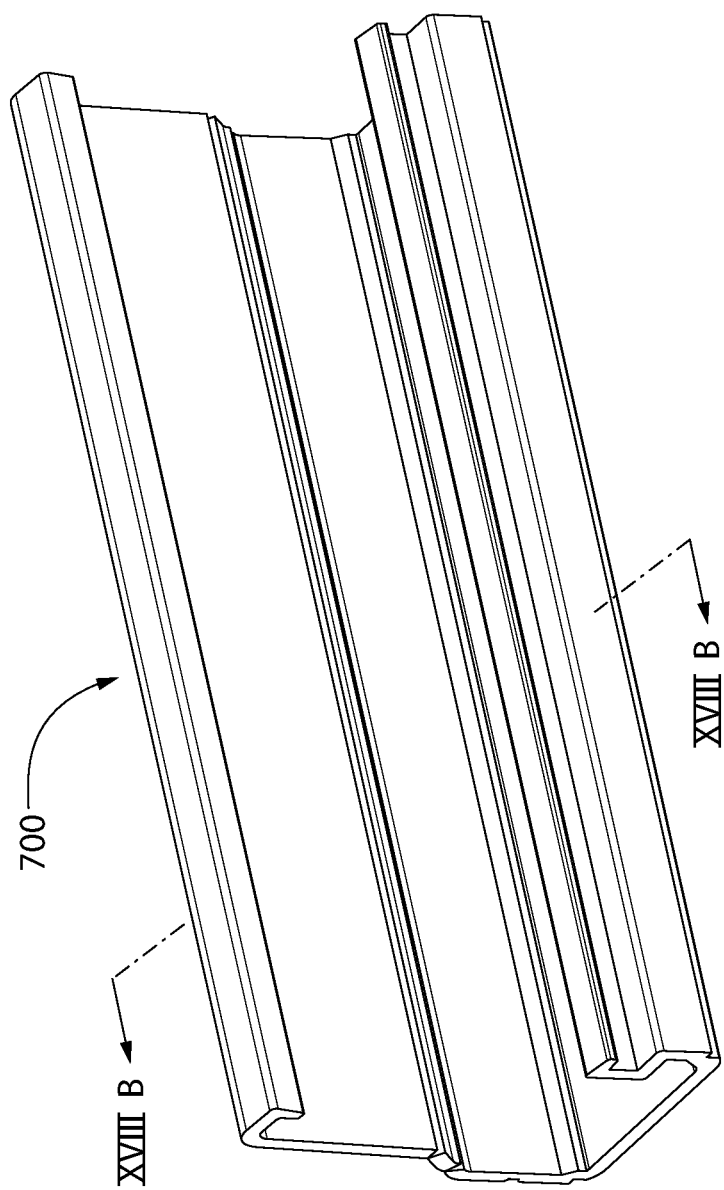
Figure 18A:
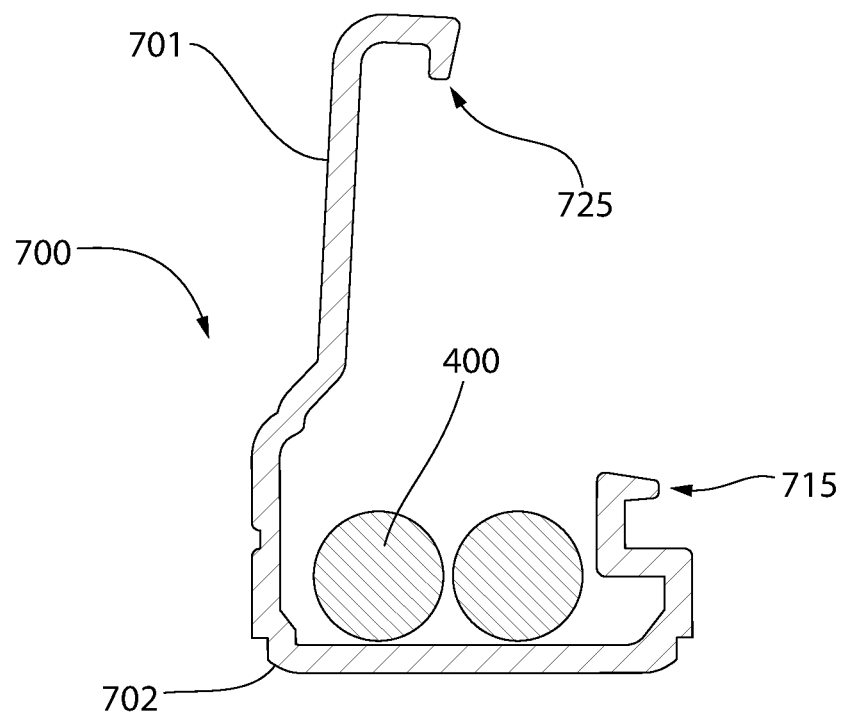
FIG. 18A is a cross-sectional view taken along line XVIIIA-XVIIIA of FIG. 17A, wherein cables are illustrated in a cavity of the track member.
Figure 18B:
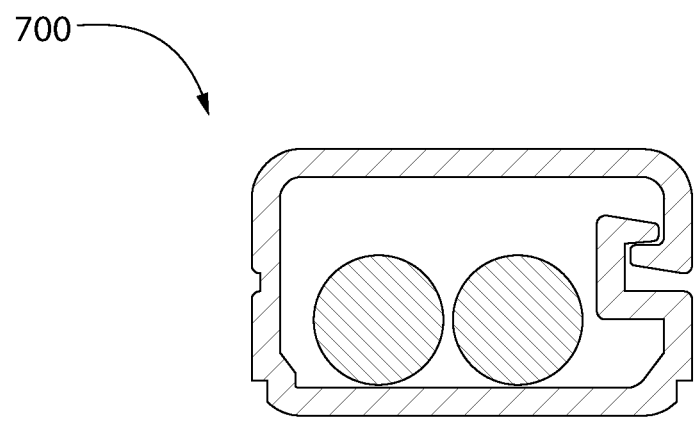
FIG. 18B is a cross-sectional view taken along line XVIIIB-XVIIIB of FIG. 17B, wherein cables are illustrated in a cavity of the track member.

In the exemplified embodiment, various coupler members 650 are attached to the track members 600 (much like the coupler members 300 described above) to cover the gaps between the adjacent track members 600. As seen in FIG. 16A, in this embodiment at least one of the coupler members 650 has a cord port 651 so that the cables 400 can pass therethrough and into the cavities 605 of the track members 600 and the spaces between the coupler members 650 and the wall 1. As best seen in FIG. 16B, the coupler members 650 comprise connection features that nest within and/or otherwise mate with connection features of the track member 600 to couple the coupler members 650 to the track members 600.

Referring to FIGS. 17A-18B, an alternative embodiment of a track member 700 is illustrated. The track member 700 is identical to the track member 600 in terms of function but simply has a different rectilinear shape in overall profile and transverse cross section as opposite to a quarter-round shape. Track member 700 includes an L-shaped base or body portion 702 and pivotably closeable cover portion 701 connected thereto by a living hinge. A snap-fit closure is provided similar to track member 600. Body portion 702 has a first locking feature 715 and the cover portion 701 has a second locking feature 725 that mates with the first locking feature 615 to lock the cover portion 620 into the closed state. The mating locking features may be considered hook-shaped which become mutually engaged to form an interlock that keeps the cover closed. Whereas the track member 600 can accommodate up to three cables in the exemplified embodiment, the track member 700 can only accommodate up to two wires of the same size or gauge in the illustrated embodiment assuming the same base or floor-side dimension for each. Larger or smaller track member 700 dimensions may be provided to accommodate more or less cables 400. Otherwise, operation and function is the same and it will not be repeated with regard to the track member 700 in the interest of brevity.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A cable management system comprising:
   a mounting bracket configured to be coupled to a wall support surface so that a rear wall of the mounting bracket is adjacent to the wall support surface, the rear wall including a bottom end configured to engage a floor surface and a top end;
   the mounting bracket comprising a plurality of ledges extending forwardly from the rear wall in a direction away from the wall support surface, each of the plurality of ledges configured to support one or more cables;
   the plurality of ledges comprising an uppermost ledge extending from the top end of the rear wall, the uppermost ledge comprising a top surface that forms an uppermost surface of the mounting bracket;
   a cover member detachably coupled to the mounting bracket so that the one or more cables supported by the plurality of ledges are hidden from view by the cover member, wherein the cover member comprises a front wall that is vertically oriented and a molding portion extending obliquely rearward from a top end of the front wall, wherein when the cover member is coupled to the mounting bracket an upper portion of the front wall of the cover member protrudes beyond the top surface of the uppermost ledge so that a first cable routing region is formed between the top surface of the uppermost ledge, an inner surface of the upper portion of the front wall of the cover member, an inner surface of the molding portion of the cover member, and the wall support surface;
   the mounting bracket comprising a first connection feature and a second connection feature, the first connection feature comprising a first arm protruding upwardly from the bottom end of the rear wall at an oblique angle and the second connection feature comprising a second arm protruding downwardly from a bottom surface of the uppermost ledge;
   the cover member comprising a third connection feature and a fourth connection feature, the third connection feature comprising a third arm extending downwardly from the inner surface of the front wall at an oblique angle and the fourth connection feature comprising a fourth arm extending upwardly from the inner surface of the front wall at an oblique angle; and
   wherein when the cover member is coupled to the mounting bracket the third connection feature of the cover member engages the first connection feature of the mounting bracket and the fourth connection feature of the cover member engages the second connection feature of the mounting bracket.

2. The cable management system according to claim 1, wherein the third connection feature of the cover member is insertably received in a forwardly open receptacle defined at the bottom end of the mounting bracket by the first connection feature of the mounting bracket.

3. The cable management system according to claim 2, wherein a lowermost ledge of the plurality of ledges of the mounting bracket is configured to engage the first connection feature of the cover member, the lowermost ledge having an L-shape.

4. The cable management system according to claim 1, wherein the fourth connection feature of the cover member is located midway between a bottom end of the front wall and a top end of the front wall.

5. The cable management system according to claim 1, wherein the plurality of ledges further comprises a lowermost ledge and a middle ledge spaced apart from the lowermost ledge and the uppermost ledge on the rear wall of the mounting bracket.

6. The cable management system according to claim 5, wherein the middle ledge is L-shaped and protrudes forwardly from the rear wall of the mounting bracket.

7. The cable management system according to claim 5, further comprising:
- a second cable routing region formed between the lowermost ledge and the middle ledge configured to receive the one or more cables; and
- a third cable routing region formed between the middle ledge and the uppermost ledge configured to receive the one or more cables.

8. The cable management system according to claim 6, wherein uppermost ledge is upwardly angled and protrudes forwardly from the top end of the mounting bracket.

9. The cable management system according to claim 1, further comprising:
- a coupler member comprising a bottom end having a pivot tab and a top end having a locking tab;
- the cover member comprising a pivot notch adjacent to a bottom end of the cover member and a locking notch at a top end of the cover member; and
- wherein the coupler member is configured to be detachably coupled to the cover member via engagement between the pivot tab of the coupler ember and the pivot notch of the cover member and via engagement between the locking tab of the coupler member and the locking notch of the cover member.

10. The cable management system according to claim 1, wherein the molding portion of the cover member comprises a front surface having ornamentation.

11. The cable management system according to claim 1, wherein the plurality of ledges comprises the uppermost ledge, a lowermost ledge, and a middle ledge located between the uppermost and lowermost ledges, and further comprising a first mounting aperture in the rear wall at a location between the uppermost ledge and the middle ledge and a second mounting aperture in the rear wall at a location between the lowermost ledge and the middle ledge.

12. A method for installing a cable management system comprising:
- providing a mounting bracket and a cover member configured for attachment to the mounting bracket;
- coupling the mounting bracket to a vertical support wall, the mounting bracket comprising a plurality of horizontally protruding cable support ledges configured to support one or more cables;
- positioning the cover member at an oblique angle adjacent to the mounting bracket;
- inserting a rearwardly protruding first connection element of the cover member into a forwardly open receptacle formed at a bottom end of the mounting bracket;
- pivoting the cover member about the rearwardly protruding first connection element such that a top end of the cover member rotates rearwardly towards a top end of the mounting bracket;
- snapping the cover member onto the mounting bracket;
- wherein the one or more cables are hidden from view by the cover member; and
- inserting a pivot tab of a coupler member into a pivot notch at a bottom of the cover member, and then rotating the coupler member toward the cover member until a locking tab on the coupler member engages a locking notch at the top end of the cover member to secure the coupler member in place.

* * * * *